United States Patent
Crawford et al.

(10) Patent No.: US 9,965,184 B2
(45) Date of Patent: May 8, 2018

(54) MULTIPLE STORAGE SUBPOOLS OF A VIRTUAL STORAGE POOL IN A MULTIPLE PROCESSOR ENVIRONMENT

(71) Applicant: INTERNATIONAL BUSINESS MACHINES CORPORATION, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 14/887,237

(22) Filed: Oct. 19, 2015

(65) Prior Publication Data
US 2017/0109045 A1    Apr. 20, 2017

(51) Int. Cl.
*G06F 12/00* (2006.01)
*G06F 3/06* (2006.01)
(Continued)

(52) U.S. Cl.
CPC ............ *G06F 3/0604* (2013.01); *G06F 3/067* (2013.01); *G06F 3/0631* (2013.01);
(Continued)

(58) Field of Classification Search
CPC .... G06F 3/0604; G06F 3/0631; G06F 3/0647; G06F 3/0665; G06F 3/067;
(Continued)

(56) References Cited

U.S. PATENT DOCUMENTS 6,925,528 B2    8/2005 Selkirk et al.
7,392,261 B2    6/2008 Clark et al.
(Continued)

FOREIGN PATENT DOCUMENTS

| CN | 1304961 | 3/2007 |
|---|---|---|
| CN | 101788889 | 8/2011 |

OTHER PUBLICATIONS

English translation of CN1304961 dated Mar. 14, 2007.
(Continued)

*Primary Examiner* — Reba I Elmore
(74) *Attorney, Agent, or Firm* — William K. Konrad; Konrad Raynes Davda & Victor LLP

(57) ABSTRACT

In one aspect, a storage management system of a storage controller having a set of processor nodes, in response to a request by a user to add a storage pool to the storage system, adds a set of subpools of storage, one for each processor node of the storage controller. The resultant storage capacity is the combination of the individual storage capacities of each subpool of the set of storage subpools. Accordingly, each subpool of the set is automatically assigned to a different processor node. In this manner, the user may be relieved of the task of manually assigning storage pools to processor nodes. In addition, load balancing between the processor nodes may be facilitated. Other aspects and features are described herein.

24 Claims, 11 Drawing Sheets

(51) Int. Cl.
  *G06F 12/0802* (2016.01)
  *G06F 12/06* (2006.01)
  *G06F 12/1036* (2016.01)
  *G06F 12/02* (2006.01)

(52) U.S. Cl.
  CPC .......... *G06F 3/0685* (2013.01); *G06F 3/0647* (2013.01); *G06F 3/0665* (2013.01); *G06F 12/0284* (2013.01); *G06F 12/063* (2013.01); *G06F 12/0646* (2013.01); *G06F 12/0802* (2013.01); *G06F 12/1036* (2013.01)

(58) Field of Classification Search
  CPC ............... G06F 12/0284; G06F 12/063; G06F 12/0646; G06F 12/0802; G06F 12/1036
  USPC ...... 711/165, 169, 173, 203; 710/20, 43, 52; 712/16, 225
  See application file for complete search history.

(56) References Cited

U.S. PATENT DOCUMENTS

| | | | |
|---|---|---|---|
| 7,689,803 | B2 | 3/2010 | Karr et al. |
| 8,996,837 | B1 | 3/2015 | Bono et al. |
| 2002/0026502 | A1* | 2/2002 | Phillips ................... H04L 29/06 709/219 |
| 2006/0031653 | A1* | 2/2006 | Todd ..................... G06F 3/0622 711/170 |
| 2007/0233997 | A1* | 10/2007 | Kobara ................. G06F 3/0605 711/170 |
| 2010/0161879 | A1 | 6/2010 | Nation et al. |
| 2010/0271989 | A1* | 10/2010 | Chernoguzov .. G05B 19/41855 370/310 |
| 2011/0208941 | A1* | 8/2011 | Gill ............................. G06F 3/06 711/170 |
| 2014/0317206 | A1* | 10/2014 | Lomelino ........... H04L 67/1097 709/206 |
| 2014/0334495 | A1 | 11/2014 | Stubberfield et al. |
| 2014/0351545 | A1 | 11/2014 | Nakajima |
| 2014/0365898 | A1* | 12/2014 | Jaquet ................... G06F 9/5016 715/734 |
| 2015/0326531 | A1* | 11/2015 | Cui ........................ H04L 63/029 726/3 |
| 2016/0191310 | A1* | 6/2016 | Brandwine ............. H04L 45/04 709/220 |
| 2016/0205179 | A1* | 7/2016 | Cui ........................ G06F 9/5083 709/226 |
| 2016/0306581 | A1* | 10/2016 | Belgaied ............... G06F 3/0631 |

OTHER PUBLICATIONS

English translation of CN101788889 dated Aug. 10, 2011.
A. Gune, "IBM DS8870 Storage Array Platform", Fibre Channel SAN, pp. 5, [online][retrieved Sep. 25, 2015] http://searchstorage.techtarget.com/feature/IBM-DS8870-Storage-Array-Platform.
"A Method and System for Dynamically Balancing Spare Drives, DA Pair and a Processor Node of RAID arrays in a Storage Environment", IP.com, IP.com No. 000239351, electronically published Nov. 1, 2014, pp. 6.

* cited by examiner

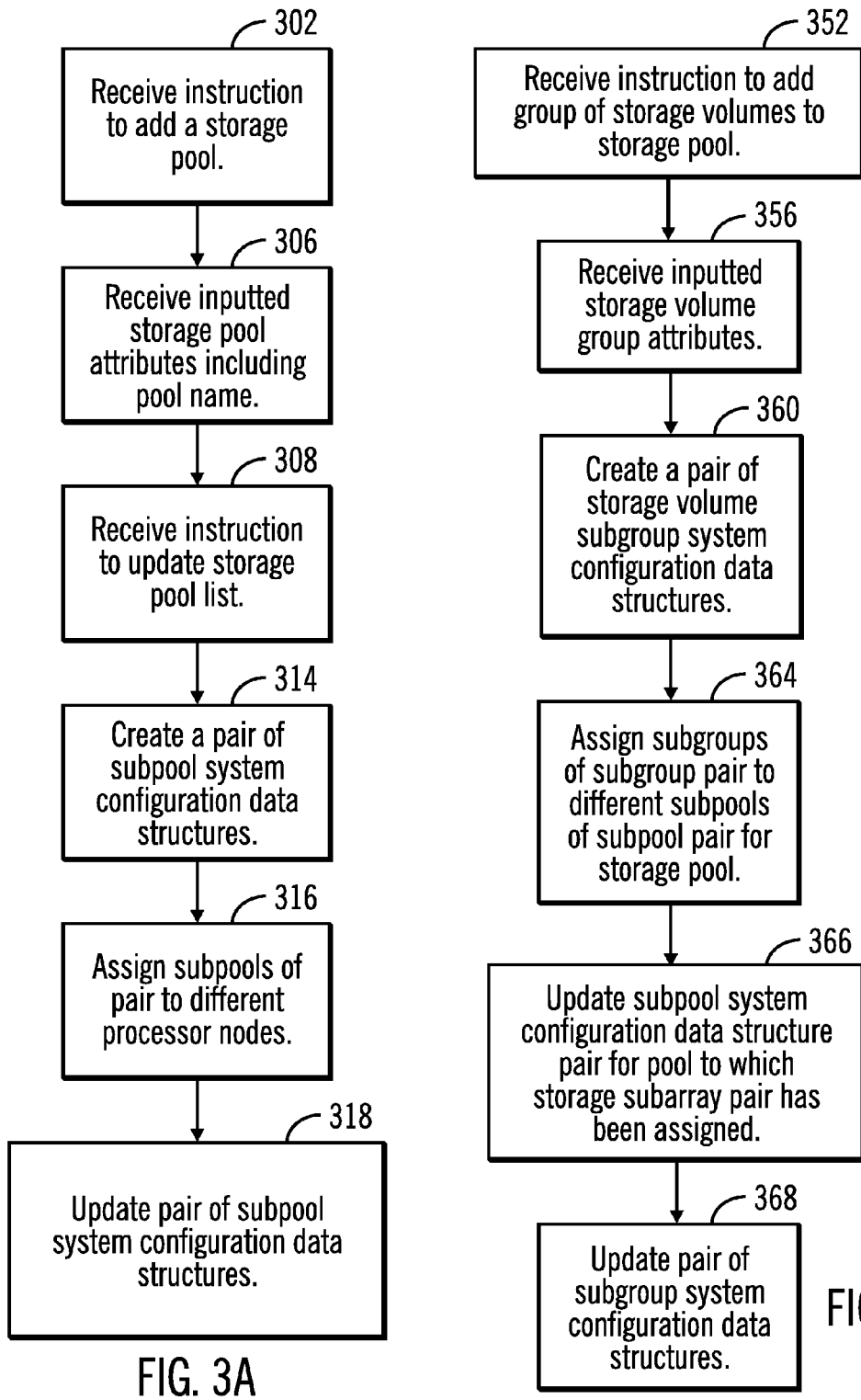

| 502 | 504 | 506 | 508 | 512 | 514 | 516 | 518 |
|---|---|---|---|---|---|---|---|
| Subpool ID | Pool Name | List of Assigned SubArrays | Paired Subpool ID | Assigned Processor Node ID | Encryption Policy | Migration Mode | Storage Attributes |

| 502 | 504 | 506 | 508 | 512 | 514 | 516 | 518 |
|---|---|---|---|---|---|---|---|
| Subpool ID = SubPool1a | Pool Name = StoragePool1 | List of Assigned SubArrays = ASL1a | Paired Subpool ID = SubPool1b | Assigned Processor Node ID = ProcessorNode1 | Encryption Policy = EP1 | Migration Mode = MM1 | Storage Attributes |

500a

| 502 | 504 | 506 | 508 | 512 | 514 | 516 | 518 |
|---|---|---|---|---|---|---|---|
| Subpool ID = SubPool1b | Pool Name = StoragePool1 | List of Assigned SubArrays = ASL1b | Paired Subpool ID = SubPool1a | Assigned Processor Node ID = ProcessorNode2 | Encryption Policy = EP1 | Migration Mode = MM1 | Storage Attributes |

| Subarray ID 602 | Array Name 604 | Paired Subarray ID 608 | Assigned Processor Node ID 612 | Assigned Subpool ID 614 | Array Type 616 | Subarray Capacity 618 |
|---|---|---|---|---|---|---|

| SubArray ID= SubArray 72a 602 | Array Name= DiskArray 72 604 | Paired Subarray ID= Subarray 72b 608 | Assigned Processor Node ID= ProcessorNode1 612 | Assigned Subpool ID= SubPool1a 614 | Array Type= Disk Array 616 | Subarray Capacity= 1/2 CAPACITY1 618 |
|---|---|---|---|---|---|---|

600b →

| SubArray ID= SubArray 72b 602 | Array Name= DiskArray 72 604 | Paired Subarray ID= Subarray 72a 608 | Assigned Processor Node ID= ProcessorNode2 612 | Assigned Subpool ID= SubPool1b 614 | Array Type= Disk Array 616 | Subarray Capacity= 1/2 CAPACITY1 618 |
|---|---|---|---|---|---|---|

FIG. 7A

| Volume SubGroup ID (702) | Volume Group Name (704) | List of Volumes in SubGroup (706) | Paired Subgroup ID (708) | Assigned Processor Node ID (712) | Assigned Subgroup ID (714) |
|---|---|---|---|---|---|

| Volume SubGroup ID = VolSubGroup 77a (702) | Volume Group Name = VolGroup 77 (704) | List of Volumes in SubGroup = VolList1 (706) | Paired Subgroup ID = VolSubGroup 77b (708) | Assigned Processor Node ID = ProcessorNode1 (712) | Assigned Subpool ID = SubPool1a (714) |
|---|---|---|---|---|---|

700b →

| Volume SubGroup ID = VolSubGroup 77b (702) | Volume Group Name = VolGroup 77 (704) | List of Volumes in SubGroup = VolList2 (706) | Paired Subgroup ID = VolSubGroup 77a (708) | Assigned Processor Node ID = ProcessorNode2 (712) | Assigned Subpool ID = SubPool1b (714) |
|---|---|---|---|---|---|

MULTIPLE STORAGE SUBPOOLS OF A VIRTUAL STORAGE POOL IN A MULTIPLE PROCESSOR ENVIRONMENT

BACKGROUND OF THE INVENTION

1. Field of the Invention

The present invention relates to a computer program product, system, and method having storage pools managed in a storage management system.

2. Description of the Related Art

In a storage environment, a storage controller also often referred to as a server, frequently has a pair of processor nodes to process input/output (I/O) instructions from one or more hosts to write data to or read data from data storage units controlled by the storage controller. The storage units are typically grouped in arrays of storage units such as an array of disk drives, for example. One or more arrays of storage units may in turn be grouped in a storage pool managed by the storage controller. Several such storage pools may be managed by a storage controller.

To promote balancing the loads on the processor nodes of the storage controller, storage management systems have frequently required the user when adding a storage pool to the system, to assign one of the processor nodes of the pair of processor nodes of the storage controller, to control the I/O operations between the host and the storage units of the storage pool being added. Moreover, if adding one storage pool, the user may be required to add a second storage pool at the same time and of the same type, and to assign the other processor node of the pair of processor nodes to control the I/O operations between the host and the storage units of the second storage pool being added. Still further, the management system may require the user to specify an equal amount of storage capacity for each of the two storage pools being added, to facilitate load balancing between the processor nodes of the pair of processor nodes of the storage controller.

The data is frequently stored in the storage units in units of data often referred to as a "storage volume." To create a group of storage volumes, the user typically selects a storage pool from which storage capacity will be allocated to the group of storage volumes being added. Since each storage pool is assigned to a particular processor node, the load balance between the processor nodes may be adversely affected, depending upon which storage pool the user selects for the group of storage volumes being added.

A storage controller and the storage pools, storage arrays and storage volumes controlled by the controller, are typically configured and administered by a user through a storage management system operating on the storage controller. Such management systems usually include a user interface such as a graphical user interface (GUI) which facilitates such configuration and administration. In one type of such management system, the management system maintains in a database, system configuration data identifying the storage pools, storage arrays and storage volumes which have been added to the system. Such system configuration data is frequently stored in data structures in the database.

SUMMARY

In one aspect of the present description, a virtual storage pool comprises a set of storage subpools wherein the storage capacity of the virtual storage pool is the combined storage capacities of the set of storage subpools. Each processor node of the plurality of processor nodes of the storage controller is assigned at least one storage subpool of the set of storage subpools of the virtual storage pool so that input/output operations to and from each storage subpool are processed primarily by the associated processor node to which the storage subpool is assigned.

In another aspect, a storage management system maintains a set of storage subpool data structures representing the virtual storage pool so that each storage subpool of the set of storage subpools of the virtual storage pool, is represented by a storage subpool data structure of the set of subpool data structures. Each subpool data structure stores storage subpool attribute data defining attributes of an associated storage subpool of the set of storage subpools of the virtual storage pool. The storage subpool attribute data stored in each storage subpool data structure of the set of storage subpool data structures for virtual storage pool includes a name attribute which defines a name of the virtual storage pool of the set of storage subpools. Other aspects are described.

BRIEF DESCRIPTION OF THE DRAWINGS

FIGS. 3a-3c depict various embodiments of operations of the system component management of the storage management system of FIG. 1.

FIGS. 5a-5b depict various embodiments of storage subpool system configuration data structures of the system component management of the storage management system of FIG. 1.

FIGS. 6a-6b depict various embodiments of storage subarray system configuration data structures of the system component management of the storage management system of FIG. 1.

FIGS. 7a-7b depict various embodiments of volume subgroup system configuration data structures of the system component management of the storage management system of FIG. 1.

DETAILED DESCRIPTION

Figure 1:
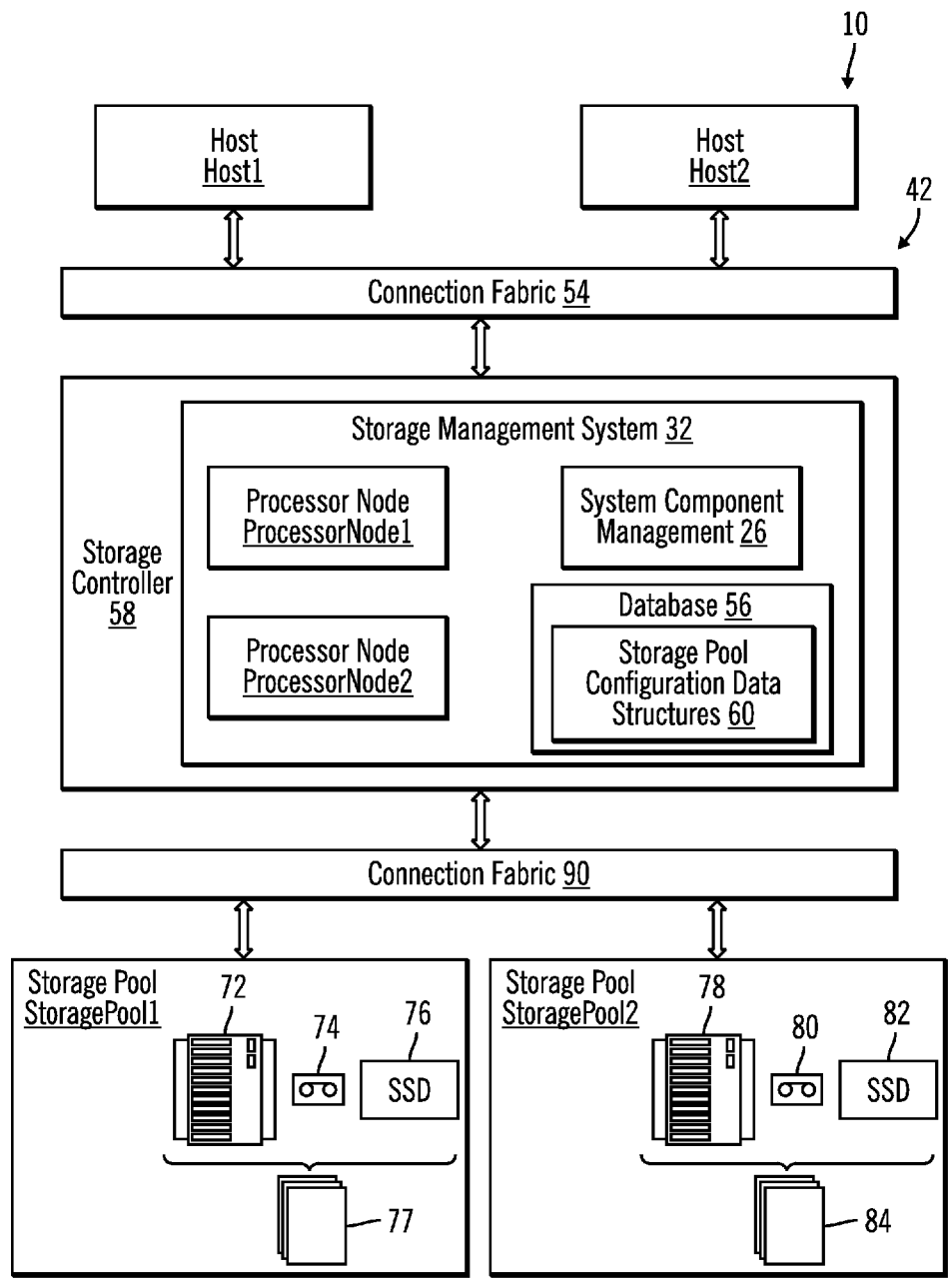
FIG. 1 illustrates an embodiment of a computing system having a storage management system employing multiple storage subpools of a virtual storage pool in accordance with the present description.

In accordance with one aspect of the present description, to increase the ease of use of a storage management interface, a storage management system in accordance with one embodiment creates what is referred to herein as a "virtual" storage pool in response to a request by a user to add a storage pool to the storage system. However, instead of adding a single pool to the storage system in response to the request, a pair of storage pools which are referred to herein as "subpools" are automatically added to fulfill the request for one storage pool. The resultant storage capacity of the virtual pool is the combination of the individual storage capacities of the pair of storage subpools.

In a storage controller having two processor nodes, each subpool of the pair is automatically assigned to a different processor node. In this manner, the user may be relieved of the task of manually assigning storage pools to processor nodes. Instead, a degree of load balancing may automatically be achieved by the storage system creating a pair of storage subpools in response to a request to add a storage pool and automatically assigning the pair of storage subpools to different processor nodes. Accordingly, the input/output operations to and from each storage subpool of the pair are processed primarily by the associated processor node to which the storage subpool is assigned. Other aspects and features are described herein.

In addition, the pair of subpools may be effectively managed by the user as a single storage pool and thus is referred to herein as a "virtual" storage pool which is actually implemented in the storage management system as a pair of storage pools referred to herein as the pair of storage subpools of the virtual storage pool. Thus, in one embodiment for example, the user need not be concerned with assigning the virtual storage pool to any one processor node because the pair of subpools implementing the virtual storage pool are automatically assigned to different processor nodes, to facilitate load balancing. Other aspects and features may be achieved in a storage management system employing multiple storage subpools of a virtual storage pool in accordance with the present description, depending upon the particular application.

Although one embodiment of the present description is described in connection with a storage controller having two processor nodes, it is appreciated that aspects of the present description are also applicable to multiple processor node storage controllers having more than two such processor nodes. For example, a storage controller having multiple processor nodes may be accommodated by adding a set of storage subpools to fulfill a request for a storage pool in which each storage subpool of the set is assigned to a different processor node. Thus, in a storage controller having three processor nodes, for example, a set of three storage subpools may be added to fulfill a request for a storage pool in which each of the three storage subpools of the set is assigned to a different one of the three processor nodes.

It is further appreciated that in some embodiments, the number of storage subpools in each set of storage subpools implementing a virtual storage pool need not match the number of processor nodes in the storage controller but may vary, depending upon the particular application. Hence, it is believed that load balancing may be improved in some embodiments without a one to one correspondence between the storage subpools of a set of storage subpools implementing a virtual storage pool, and the number of processor nodes of the storage controller. However, in other embodiments, there may be a one to one correspondence between the storage subpools of a set of storage subpools implementing a virtual storage pool, and the processor nodes of the storage controller. Thus, in a storage controller having a pair of processor nodes, in one embodiment, a corresponding pair of subpools may be added, each subpool of the pair being assigned to a corresponding one of the pair of processor nodes which is different from that of the processor node assigned to the other storage subpool of the pair of storage subpools implementing the virtual storage pool.

In another aspect of the present description, as explained in greater detail below, in response to a request by the user to add an array of storage to a virtual storage pool as described above, a virtual array of storage is created comprising a pair of subarrays of storage. Each storage subarray of the pair of storage subarrays is assigned to a different storage subpool of the pair of storage subpools implementing the virtual storage pool to which the storage is being added. Similarly, in response to a request by the user to add a group of storage volumes to a virtual storage pool as described above, a virtual group of storage volumes is created comprising a pair of subgroups of storage. Each storage volume subgroup of the pair of storage volume subgroups is assigned to a different storage subpool of the pair of storage subpools implementing the virtual storage pool. Such an arrangement can facilitate load balancing as described below. Other aspects may be realized, depending upon the particular application.

Figure 2A:
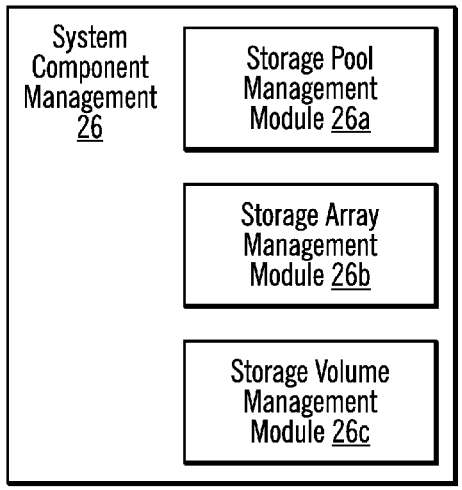
FIG. 2a illustrates an embodiment of a system component management of the storage management system of FIG. 1.

FIG. 1 illustrates one embodiment of a storage environment 10 employing system component management 26 having sets of storage subpools to implement virtual storage pools in a storage management system management 32 in accordance with the present description. As explained in greater detail below, data structures may be used to store system configuration data to represent system components including storage pools, storage arrays and storage volume groups. As shown in FIG. 2a, the system component management 26 includes various system component modules including a storage pool management module 26a for managing creation, deletion and editing of representations of storage pools, a storage array management module 26b for managing creation, deletion and editing of representations of storage arrays, and a storage volume group management module 26c for managing creation, deletion and editing of representations of storage volume groups. It is appreciated that in other embodiments, the system component management may have other modules in addition to or instead of those depicted.

The environment 10 (FIG. 1) includes a server 42 and a plurality of hosts as represented by the hosts, host1, host2, etc. Although the drawing of FIG. 1 depicts two such hosts for simplicity sake, it is appreciated that a storage environment may have a fewer or greater number of hosts, depending upon the particular application.

The server 42 may comprise a modified version of an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world). The server 42 is modified to provide a storage management system employing a management interface in accordance with the present description.

A connection fabric 54 interconnects specific hosts to a storage controller 58, typically via host ports which may be assigned to specific hosts. The connection fabric 54 includes various connection devices for connecting each host port of the storage controller 58 to its assigned host so that there is a signal path connecting a host port to its assigned host. Such connection devices may include cables including wire or fiber optic cables, switches, wireless transmitters and receivers, busses, networks, routers etc., depending upon the particular application. A signal path between a host port and its assigned host is typically achieved by configuring appropriate connection devices. Such configuration may be done physically or through appropriate software, depending upon the particular application. It is appreciated that a host may be assigned to more than one host port and in some applications, a host port may be assigned to more than one host. One example of a host port is a Small Computer System Interface (SCSI) host port. It is appreciated that other types of host ports may be utilized, depending upon the particular application.

Figure 2C:
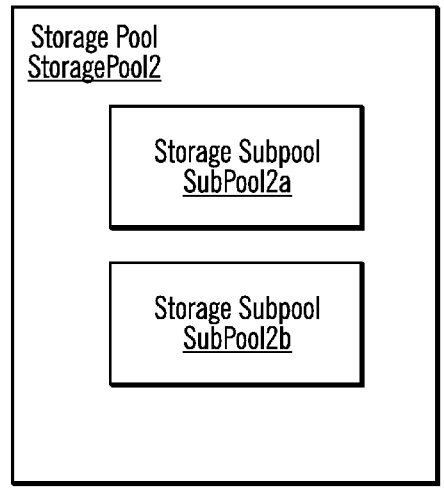
FIG. 2c is a graphical representation of another virtual storage pool comprising a pair of storage subpools in accordance with one aspect of the present description.
Figure 2B:
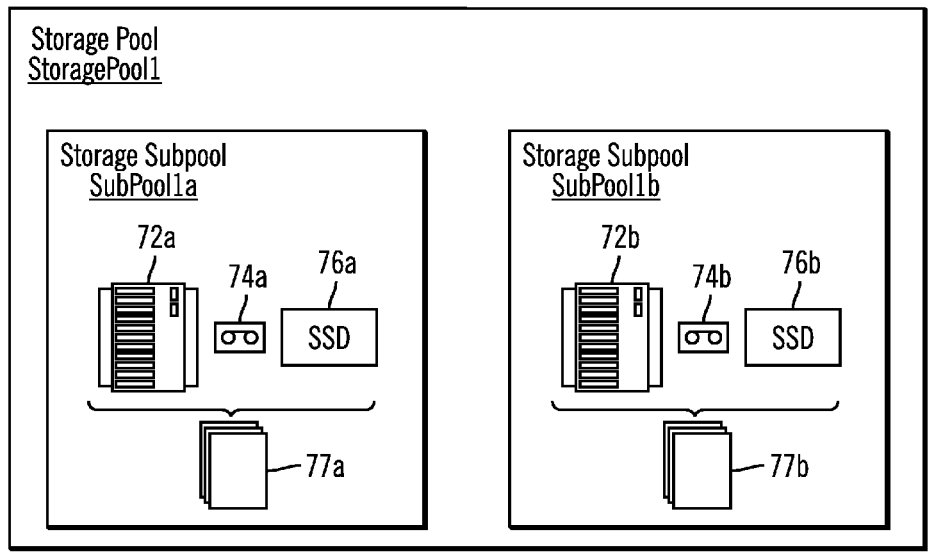
FIG. 2b is a graphical representation of a virtual storage pool comprising a pair of storage subpools in accordance with one aspect of the present description.

The storage controller 58 of the server 42, controls one or more data storage units such as an array 72 of disk drives, an array 74 of tape storage, and an array 76 of solid state memory, etc., which have been assigned to a storage pool StoragePool1, in FIG. 1. As explained in greater detail below, The storage pool StoragePool1 of FIG. 1 is a virtual storage pool implemented with a pair of storage subpools, SubPool1a, SubPool1b as shown in FIG. 2b. In addition, the array 72 (FIG. 1) of disk storage is a virtual array of disk storage implemented with a first SubArray 72a of disk storage assigned to the storage subpool, SubPool1a, and with a second SubArray 72b of disk storage assigned to the storage subpool, SubPool1b of the pair of storage subpools implementing the virtual storage pool, StoragePool1.

Similarly, the array 74 (FIG. 1) of tape storage is a virtual array of tape storage implemented with a first subarray 74a of tape storage assigned to the storage subpool, SubPool1a, and with a second subarray 74b of tape storage assigned to the storage subpool, SubPool1b of the pair of storage subpools implementing the virtual storage pool, StoragePool1. Similarly, the array 76 (FIG. 1) of solid state memory storage is a virtual array of solid state memory storage implemented with a first subarray 76a of solid state memory assigned to the storage subpool, SubPool1a, and with a second subarray 76b of solid state memory storage assigned to the storage subpool, SubPool1b of the pair of storage subpools implementing the virtual storage pool, StoragePool1.

Data is stored within the data storage unit as units of data which may be storage volumes, for example. Storage volumes may be grouped and managed together in a storage volume group. Other examples of units of data stored within a data storage unit are tracks, cylinders, allocation units, extents, etc. Such data units are represented in FIG. 1 as storage volumes groups such as storage volume group 77. Moreover, although the data units are depicted as storage volume groups, it is appreciated that other types of data units may be utilized in a system component management in accordance with the present description.

The storage controller 58 (FIG. 1) of the server 42, controls the groups of storage volumes, as represented by the storage volume group 77, which have been allocated from one or more data storage units such as the array 72 of disk drives, the array 74 of tape storage, and the array 76 of solid state memory, etc. As explained in greater detail below, the array storage volume group 77 is a virtual storage volume group implemented with a first storage volume subgroup 77a (FIG. 2b) assigned to the storage subpool, SubPool1a, and with a second storage volume subgroup 77b assigned to the storage subpool, SubPool1b of the pair of storage subpools implementing the virtual storage pool, StoragePool1.

In a similar manner, the storage controller 58 (FIG. 1) of the server 42, controls data storage units such as an array 78 of disk drives, an array 80 of tape storage, and an array 82 of solid state memory, etc., which have been assigned to a storage pool StoragePool2, in FIG. 1. Here too, in this embodiment, the storage pool StoragePool2 is a virtual storage pool implemented with a pair of storage subpools StorageSubPool2a (FIG. 2c), StorageSubPool2b, and the storage arrays assigned to the storage pool StoragePool2, are virtual storage arrays implemented with pairs of storage subarrays in a manner similar to that described above in connection with storage pool StoragePool1. A storage volume group 84 is a virtual storage volume group implemented with a pair of storage volume subgroups in a manner similar to that described above.

The storage controller 58 (FIG. 1) includes the storage management system 32 employing an embodiment of system component management 26 in accordance with the present description. The storage management system 32 provides for configuring and administering the storage controller 58 and the virtual storage pools, storage arrays and storage volume groups and their constituent components. The storage management system 32 maintains a database 56 which includes data structures which store system configuration data obtained through an interface of the system component management 26 to represent the virtual storage pools, storage arrays and storage volume groups of the system.

A connection fabric 90 interconnects storage controller 58 to the storage volume groups of the storage arrays of data storage units. The connection fabric 90, like the connection fabric 54 includes various connection devices for connecting the storage controller to each storage volume group stored within the storage arrays. Such connection devices again, may include cables including wire or fiber optic cables, switches, wireless transmitters and receivers, busses, networks, routers etc., depending upon the particular application. A signal path between the storage controller and a host port or storage volume is typically achieved by configuring appropriate connection devices. Such configuration may be done physically or through appropriate software, depending upon the particular application.

One or more of the connection fabrics 54, 90 may comprise a Storage Area Network (SAN), Local Area Network (LAN), Intranet, the Internet, Wide Area Network (WAN), peer-to-peer network, wireless network, arbitrated loop network, etc. The storage volumes are stored in storage units which may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, are shown, there may be any number of these components.

FIGS. 3a-3d depict examples of operations of a system component management of a storage management system, employing multiple storage subpools of a virtual storage pool in a multiple processor environment in accordance with the present description. The system component management operations depicted in FIGS. 3a-3d may be performed by at least one or more of hardware, software, or firmware alone or in combination. In one embodiment, the system component management 26 (FIG. 1) of the storage management system 32 is implemented as a part of the storage controller 58. It is appreciated that one or more of the operations of the system component management may be performed in whole or in part, in other devices such as one or more of the hosts, depending upon the particular application.

FIG. 3a is directed to operations of the storage pool management module 26a (FIG. 1), for adding a storage pool, such as one of the storage pools, StoragePool1 or StoragePool2, for example, to the storage system. As explained in greater detail below, the added storage pool will be a virtual storage pool configured with system configuration data stored in a pair of storage subpool system configuration data structures maintained by the system component management 26.

In one operation, an instruction is received (block 302, FIG. 3a) to add a storage pool to the storage system. In one embodiment, the instruction may be received from a user through an interface such as a graphical user interface (GUI) of the system component management 26 (FIG. 1). It is appreciated that an add storage pool instruction may be provided by other sources, such as auto-generation, for example.

Figure 4A:
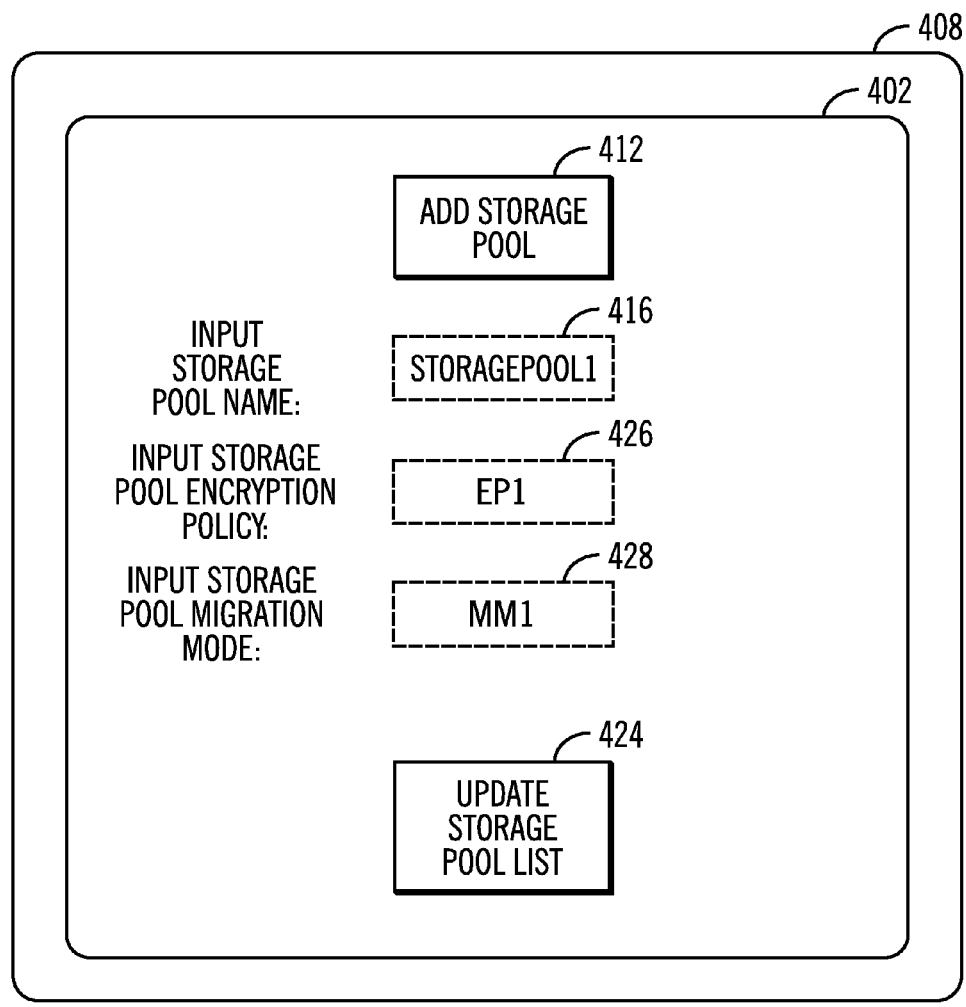
FIGS. 4a-4c depict various embodiments of Graphic User Interface (GUI) pages for inputting system configuration data to populate data structures of the system component management of the storage management system of FIG. 1.

FIG. 4a shows an example of a GUI page or window 402 of the host management module 26a (FIG. 1) displayed by a display 408 of the computing system of FIG. 1, for example. In this example, a user may provide an instruction to the system component management of the storage system management to add a storage pool by clicking on a user input button 412 labeled with the informational text "ADD STORAGE POOOL." It is appreciated that other types of GUI elements may be utilized, depending upon the particular application.

In response to receipt (block 302, FIG. 3a) of the instruction to add a storage pool, the interface enables the user to input storage pool attributes including the name of storage pool to be added. The inputted storage pool attributes are received (block 306) by the storage management system. In this example, the name of the storage pool to be added may be inputted for example, using the GUI 402 of FIG. 4a, for example. Thus, a storage pool name such as StoragePool1 (FIG. 1), for example, may be input into a text field 416, for example. Additional storage pool attributes may be entered through the GUI 402 as well, as discussed below. It is appreciated that storage pool attributes may be input using other input techniques.

Using the inputted storage pool attributes including the storage pool name, the storage management system can initiate the process of updating the list of storage pools added to the storage system. The list of storage pools may be updated automatically in response to receipt of the user's storage pool attributes or may be updated in response to receipt of an update instruction (block 308) triggered by the user clicking on an "UPDATE STORAGE POOL LIST" input button 424 (FIG. 4a), for example.

In the illustrated embodiment, the storage pool being added, storage pool StoragePool1 in this example, is a virtual storage pool implemented with a pair of (that is, two) storage subpools, SubPool1a, SubPool1b (FIG. 2b) in this example, one for each of the processor nodes, ProcessorNode1, ProcessorNode2 (FIG. 1) of the storage controller 58. Each storage subpool of the pair of storage subpools, is represented by a storage subpool data structure, an example of which is the storage subpool data structure 500 of FIG. 5a. The system component management 26 of the storage management system 32 maintains the system configuration data structures such as the storage subpool data structure 500 of FIG. 5a. Each system configuration data structure 500 is configured to store system configuration data for a storage subpool in the form of attribute data.

As shown in FIG. 5a, the storage subpool data structure 500, in one embodiment, includes attribute fields including an attribute field 502 to store a storage subpool ID (identification) attribute such as a serial number or name, for example, and an attribute field 504 to store the name of the virtual storage pool represented by the pair of storage subpools, one of which is the particular storage subpool represented by the data structure 500. The storage subpool data structure 500, in one embodiment, further has an attribute field 506 to store a list of storage subarrays assigned to that storage subpool, and an attribute field 508 to identify the particular storage subpool which has been paired with the particular storage subpool represented by the storage subpool data structure 500, to implement a virtual storage pool. The data structure 500 further has an attribute field 512 to identify the particular processor node to which the particular storage subpool of the data structure 500 has been assigned, an attribute field 514 to identify the encryption policy to be employed for the particular storage subpool of the data structure 500, an attribute field 516 to identify a migration mode to be employed for the storage subpool and a plurality of volume and storage attribute fields 518 explained below. It is appreciated that in other embodiments, a storage subpool system configuration data structure may have additional attributes and attribute fields, fewer attributes and attribute fields or different attributes and attribute fields, depending upon the particular application.

In this embodiment as set forth above, the storage pool name attribute 504 when defined, indicates the name of the particular virtual storage pool implemented by a pair of storage subpools, one of which is represented by the storage subpool data structure 500. In this embodiment, in connection with the receipt (blocks 306, 308, FIG. 3a) of the storage pool attributes including the name of the storage pool to be added, and an instruction to update the storage pool list of the storage systems to be represented and managed in the storage management system, a pair of subpool system configuration data structures are created (block 314), each of which is similar to the storage subpool system configuration data structure 500 of FIG. 5a. The pair of data structures and the pair of storage subpools represented by the pair of storage subpool data structures, may be created automatically in response to receipt of the attributes of the storage pool to be added, or may be created in response to receipt of an update instruction triggered by the user clicking on an "UPDATE STORAGE POOL LIST" input button 424, for example.

In addition, the pair of storage subpools represented by the pair of data structures may be automatically assigned (block 316) to different processor nodes to promote load balancing as described below. Further, the pair of data structures representing the pair of storage subpools, may be updated (block 318) automatically in response to receipt of the storage pool attribute data or in in response to receipt of an update instruction triggered by the user clicking on an "UPDATE STORAGE POOL LIST" input button 424, for example.

FIG. 5b shows one example of a pair of storage subpool data structures 500a, 500b after they have been created and updated following the inputs provided by the add storage pool interface of FIG. 4a. For example, the storage pool name attribute field 504 of the data structure 500a has been updated to define the name attribute of the storage pool being added, in this example, StoragePool1, which is represented by the pair of storage subpool data structures 500a, 500b of FIG. 5b. Similarly, the storage pool name attribute field 504 of the data structure 500b has been updated to define the same name attribute of the storage pool being added, in this example, StoragePool1, which is represented by the pair of storage subpool data structures 500*a*, 500*b* of FIG. 5*b*.

In connection with the creation and updating of the storage subpool data structures 500*a*, 500*b*, an appropriate subpool identification may be automatically generated by the storage management system to identify the pair of storage subpools represented by the pair of storage subpool data structures 500*a*, 500*b*, for example. In this example, the storage subpool ID attribute field 502 of the data structure 500*a* has been updated to define the name or identification attribute of the storage subpool represented by the data structure 500*a* as, in this example, SubPool1*a* (FIG. 2*b*). Similarly, the storage subpool ID attribute field 502 of the data structure 500*b* has been updated to define the name or identification attribute of the storage subpool represented by the data structure 500*b* as, in this example, SubPool1*b* (FIG. 2*b*).

In this embodiment, the storage subpools, SubPool1*a* and SubPool1*b* form a pair of subpools which implement the virtual storage pool being added, StoragePool1, in this example. Accordingly, the paired subpool ID attribute field 508 of the data structure 500*a* for the storage subpool SubPool1*a*, identifies the storage subpool SubPool1*b* as the other storage subpool to which the storage subpool SubPool1*a* is paired. Conversely, the paired subpool ID attribute field 508 of the data structure 500*b* for the storage subpool SubPool1*b*, identifies the storage subpool SubPool1*a* as the other storage subpool to which the storage subpool SubPool1*b* is paired.

It is appreciated that automatic creation of a pair of storage subpools as represented by the storage subpool data structures 500*a*, 500*b*, and the automatic assignment of a subpool identification to each storage subpool of the pair, can not only promote load balancing but also increase the ease of use of the storage management interface. Thus, in one aspect of the present description, the user need not be concerned with subpool pairing or subpool identification assignment in connection with the addition of storage pools to the system.

In connection with the creation and updating of the pair of storage subpool data structures 500*a*, 500*b*, the pair of storage subpools, SubPool1*a* and SubPool2, represented by the storage subpool data structures 500*a*, 500*b* in this example, may be automatically assigned to different processor nodes to promote load balancing. In this example, the assigned processor node ID attribute field 512 of the data structure 500*a* has been automatically updated to define the assigned processor node ID attribute of the storage subpool SubPool1*a* represented by the data structure 500*a* as, in this example, the processor node ProcessorNode1 (FIG. 1). Similarly, the assigned processor node ID attribute field 512 of the data structure 500*b* has been automatically updated to define the assigned processor node ID attribute of the storage subpool SubPool1*b* represented by the data structure 500*b* as, in this example, the processor node Processor-Node2 (FIG. 1) which is different from the process node ProcessorNode1 assigned to the storage subpool SubPool1 to promote load balancing. It is appreciated that automatic creation of a pair of storage subpools as represented by the storage subpool data structures 500*a*, 500*b*, and the automatic assignment of each storage subpool of the pair to different processor nodes of the storage controller, can not only promote load balancing but also increase the ease of use of the storage management interface. Thus, in one aspect of the present description, the user need not be concerned with processor node assignment in connection with the addition of storage pools to the system.

In connection with the creation and updating of the pair of storage subpool data structures 500*a*, 500*b*, the pair of storage subpools, SubPool1*a* and Subpool2, represented by the storage subpool data structures 500*a*, 500*b* in this example, may have an encryption policy automatically assigned to the pair of subpools implementing the virtual storage pool being added. Alternatively, an encryption policy may be input by the user using a text field 426 (FIG. 4*a*) of the add a storage pool interface page 402. It is appreciated that an encryption policy for the storage pool being added may be input or assigned using a variety of techniques, depending upon the particular application.

In this example, the encryption policy attribute field 514 of the data structure 500*a* has been automatically updated to define the assigned encryption policy attribute of the storage subpool SubPool1*a* represented by the data structure 500*a* as, in this example, an encryption policy represented as "EP1" which may be a default encryption policy, for example. Similarly, the encryption policy attribute field 514 of the data structure 500*b* has been automatically updated to define the assigned Encryption policy attribute of the storage subpool SubPool1*b* represented by the data structure 500*b* as, in this example, the same encryption policy represented as "EP1" which may be a default encryption policy, for example. It is appreciated that automatic assignment of a single encryption policy to the pair of storage subpools as represented by the storage subpool data structures 500*a*, 500*b*, can increase the ease of use of the storage management interface. Thus, in one aspect of the present description, the user need not be concerned with the virtual storage pool being implemented by a pair of storage subpools.

In connection with the creation and updating of the pair of storage subpool data structures 500*a*, 500*b*, the pair of storage subpools, SubPool1*a* and Subpool2, represented by the storage subpool data structures 500*a*, 500*b* in this example, may have a migration mode automatically assigned to the pair of subpools implementing the virtual storage pool being added. Alternatively, a migration mode may be input by the user using a text field 428 (FIG. 4*a*) of the add a storage pool interface page 402. It is appreciated that a migration mode for the storage pool being added may be input or assigned using a variety of techniques, depending upon the particular application.

In this example, the migration mode attribute field 516 of the data structure 500*a* has been automatically updated to define the migration mode attribute of the storage subpool SubPool1*a* represented by the data structure 500*a* as, in this example, a migration mode represented as "MM1" which may be a default encryption policy, for example. Similarly, the encryption policy attribute field 514 of the data structure 500*b* has been automatically updated to define the migration mode attribute of the storage subpool SubPool1*b* represented by the data structure 500*b* as, in this example, the same migration mode represented as "MM1" which may be a default migration mode, for example. It is appreciated that automatic assignment of a single migration mode to the pair of storage subpools as represented by the storage subpool data structures 500*a*, 500*b*, can increase the ease of use of the storage management interface. Thus, in one aspect of the present description, the user need not be concerned with the virtual storage pool being implemented by a pair of storage subpools.

The operations of FIG. 3*a* may be repeated to add additional storage pools, such as the storage pool Storage-Pool2 of FIG. 1. As a result, the storage pool StoragePool2 can be implemented by a pair of storage subpools, each subpool of storage pool StoragePool2 being represented by an associated storage subpool data structure of a pair of subpool data structures similar to the data structures 500a, 500b of FIG. 5b. However, in this example, the pool name attribute field 504 of the data structures 500a, 500b would identify the storage pool name as StoragePool2 instead of the storage pool name StoragePool1 indicated in FIG. 5b. Other attribute fields would be modified as well. For example, the subpool ID field 502 of the data structures 500aa, 500b in this example may be changed to indicate storage subpool names such a storage subpool SubPool2a (FIG. 2c), SubPool2b, respectively, for example. Further, the list of assigned subarrays field 506 of the data structures 500a, 500b in the StoragePool2 example may also be changed as appropriate. However, each storage subpools SubPool2a, SubPool2b of the pair of storage subpools implementing the storage pool StoragePool2 would be assigned to different processor nodes in the same manner as the storage subpools SubPool1a, SubPool1b (implementing the storage pool StoragePool1) are assigned to different processor nodes as discussed above.

The added storage pool StoragePool2 may be merged with the first storage pool StoragePool1 to form a merged storage pool as discussed below. Also, the added storage pool StoragePool2 may be utilized as a target storage pool for the migration of storage volumes from a source storage pool such as the storage pool StoragePool1, for example, as discussed below.

Figure 3B:
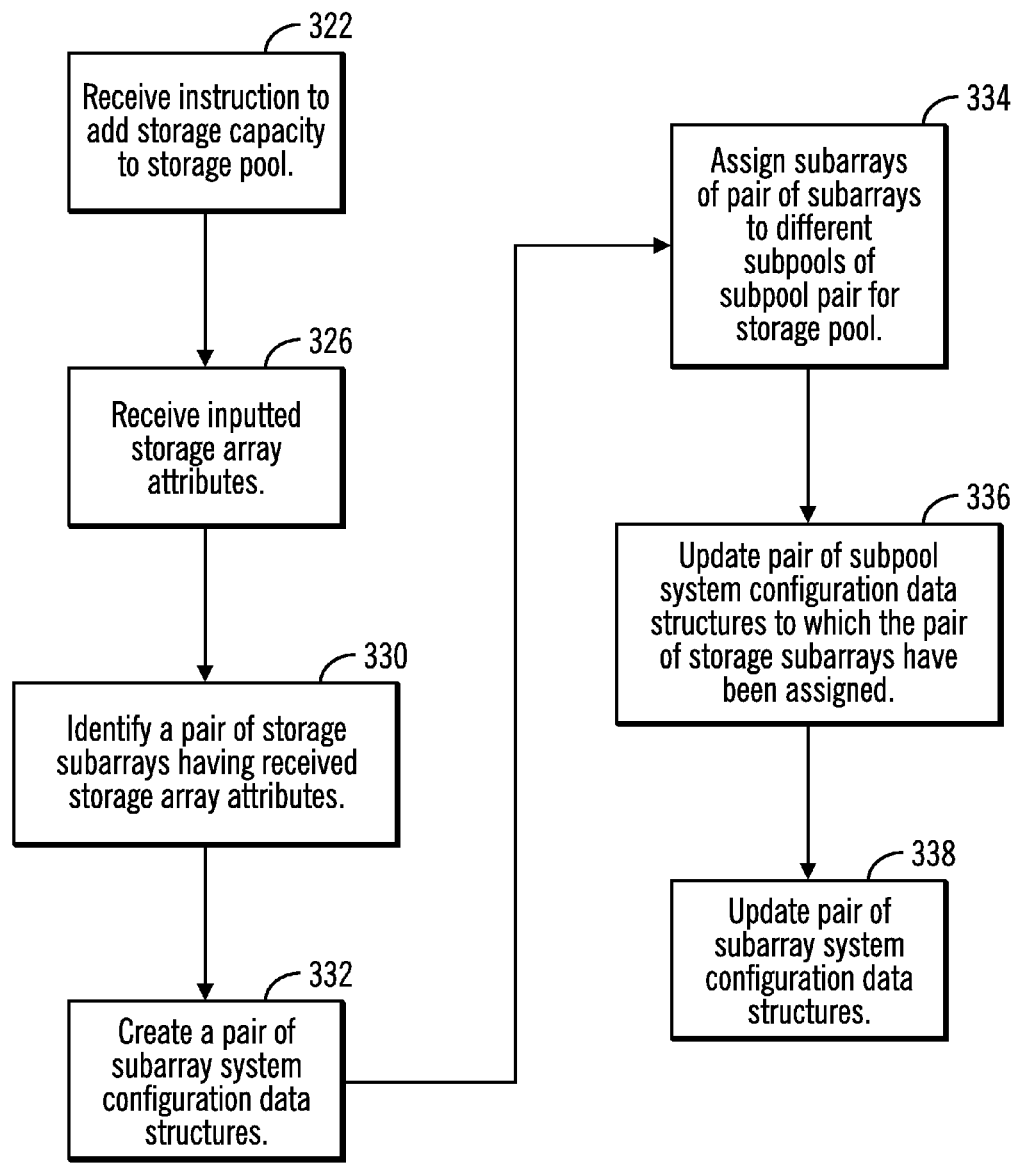

FIG. 3b is directed to operations of the storage pool management module 26b (FIG. 2a), for adding a storage array such as one of the storage arrays 72, 74. 76 (FIG. 1) to a storage pool, such as one of the storage pools, Storage-Pool1 or StoragePool2, for example, of the storage system. As explained in greater detail below, the added storage array will be a virtual storage array configured with system configuration data stored in a pair of storage subarray system configuration data structures maintained by the system component management 26.

In one operation, an instruction is received (block 322, FIG. 3b) to add a storage array to the storage system. In one embodiment, the instruction may be received from a user through an interface such as a graphical user interface (GUI) of the system component management 26 (FIG. 1). It is appreciated that an add storage array instruction may be provided by other sources, such as auto-generation, for example.

Figure 4B:
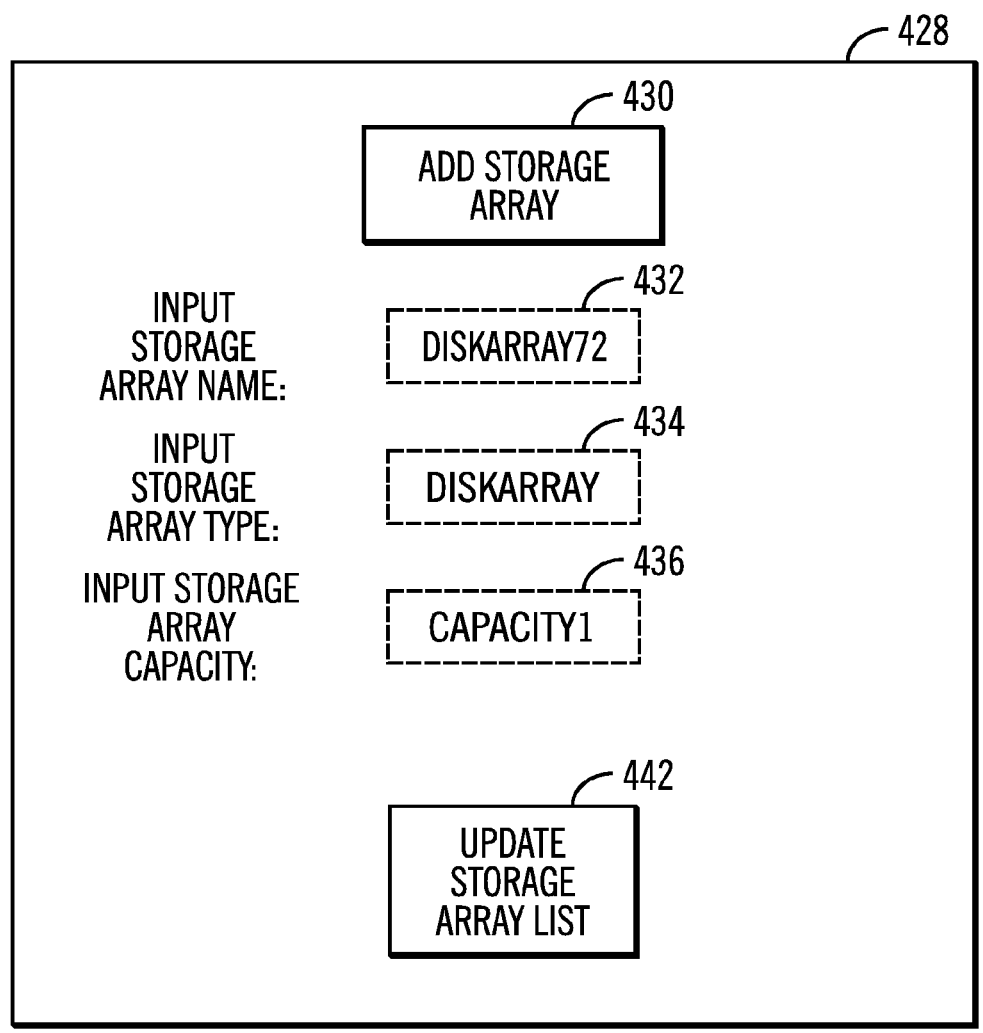

FIG. 4b shows an example of a GUI page or window 428 of the host management module 26b (FIG. 1) displayed by a display 408 (FIG. 4a) of the computing system of FIG. 1, for example. In this example, a user may provide an instruction to the system component management of the storage system management to add a storage array by clicking on a user input button 430 labeled with the informational text "ADD STORAGE ARRAY." It is appreciated that other types of GUI elements may be utilized, depending upon the particular application.

In response to receipt (block 322, FIG. 3B) of the instruction to add a storage array, the interface enables the user to input storage array attributes such as the name of storage array to be added. In this example, the storage array attributes including the name of the storage array to be added may be inputted for example, using the GUI 428 of FIG. 4B, for example. Thus, a storage array name such as DiskArray 72 (FIG. 1), for example, may be input into a text field 432, for example.

In addition, other storage array attributes may be received (block 326). For example, a storage array type, such as disk array, tape array or solid state device array, for example, may be inputted using the GUI 428 of FIG. 4B, for example. Thus, a storage array type such as disk array, for example, may be input into a text field 434, for example. Similarly, a storage array capacity for the storage array to be added, may be inputted using the GUI 428 of FIG. 4B, for example. Thus, a storage array capacity represented by the term "CAPACITY1", for example, may be input into a text field 436, for example. It is appreciated that storage array attributes such as a storage array name, type or capacity, for example, may be input using other input techniques.

Using the inputted storage array attributes, the storage management system can initiate the process of updating the list of storage arrays added to the storage system. The list of storage arrays may be updated automatically in response to receipt of the user's storage array attributes or may be updated in response to receipt of an update instruction triggered by the user clicking on an "UPDATE STORAGE ARRAY LIST" input button 442 (FIG. 4b), for example.

In the illustrated embodiment, the storage array being added, storage array DiskArray 72 in this example, is a virtual storage array implemented with a pair of (that is, two) storage subarrays, SubArray 72a, SubArray 72b (FIG. 2b) in this example, one for each of the processor nodes, ProcessorNode1, ProcessorNode2 (FIG. 1) of the storage controller 58. Each storage subarray of the pair of storage subarrays, is represented by a storage subarray data structure, an example of which is the storage subarray data structure 600 of FIG. 6a. The system component management 26 of the storage management system 32 maintains the system configuration data structures such as the storage subarray data structure 600 of FIG. 6a. Each system configuration data structure 600 is configured to store system configuration data for a storage subarray in the form of attribute data.

As shown in FIG. 6a, the storage subarray data structure 600, in one embodiment, includes attribute fields including an attribute field 602 to store a storage subarray ID (identification) attribute such as a serial number or name, for example, and an attribute field 604 to store the name of the virtual storage array represented by the pair of storage subarrays, one of which is the particular storage subarray represented by the data structure 600. The storage subarray data structure 600, in one embodiment, further has an attribute field 608 to identify the particular storage subarray which has been paired with the particular storage subarray represented by the storage subarray data structure 600, to implement a virtual storage array. The data structure 600 further has an attribute field 612 to identify the particular processor node to which the particular storage subarray of the data structure 600 has been assigned, an attribute field 614 to identify the storage subpool to which the particular storage subarray of the data structure 600 has been assigned, an attribute field 616 to identify the storage type of the storage subarray, and an attribute field 618 to identify the storage capacity of the storage subarray. It is appreciated that in other embodiments, a storage subarray system configuration data structure may have additional attributes and attribute fields, fewer attributes and attribute fields or different attributes and attribute fields, depending upon the particular application.

In this embodiment, in connection with the receipt (block 326, FIG. 3ba) of the attributes of the storage array to be added, and an instruction to update the storage array list of the storage systems to be represented and managed in the storage management system, a pair of storage subarrays meeting the specified storage attributes including storage type are identified (block 330). In addition the identified pair of storage subarrays will together having a combined total storage capacity meeting the specified storage capacity of the storage array being added. In addition, a pair of subarray system configuration data structures are created (block 332), each of which is similar to the storage subarray system configuration data structure 600 of FIG. 6a. The pair of data structures and the pair of storage subarrays represented by the pair of storage subarray data structures, may be created automatically in response to receipt of the storage array attributes and identification of storage subarrays meeting the specified attributes, or may be created in response to receipt of an update instruction triggered by the user clicking on an "UPDATE STORAGE ARRAY LIST" input button 424, for example.

In addition, each subarray of the pair of storage subarrays represented by the pair of data structures may be automatically assigned (block 334) to different subpools (and their associated processor nodes) to promote load balancing as described below. The subpool data structures representing the storage pool to which the storage array is being added, may be updated (block 336) to indicate the assignment of additional storage subarrays to the storage subpools implementing the virtual storage pool to which the virtual storage array is being added. Further, the pair of data structures representing the pair of storage subarrays, may be updated (block 338) automatically in response to receipt of the storage array attribute data or in in response to receipt of an update instruction triggered by the user clicking on an "UPDATE STORAGE ARRAY LIST" input button 424, for example.

FIG. 6b shows one example of a pair of storage subarray data structures 600a, 600b after they have been created (block 332, FIG. 3b) and updated (block 338, FIG. 3b) following the attribute inputs provided by the add storage array interface of FIG. 4b. For example, the storage array name attribute field 604 of the data structure 600a has been updated (block 338, FIG. 3b) to define the name attribute of the storage array being added as, in this example, DiskArray 72, which is represented by the pair of storage subarray data structures 600a, 600b of FIG. 6b. Similarly, the storage array name attribute field 604 of the data structure 600b has been updated (block 338, FIG. 3b) to define the same name attribute of the storage array being added, in this example, DiskArray 72, which is represented by the pair of storage subarray data structures 600a, 600b of FIG. 6b.

In connection with the creation and updating of the storage subarray data structures 600a, 600b, an appropriate subarray identification may be automatically generated by the storage management system to identify the pair of storage subarrays represented by the pair of storage subarray data structures 600a, 600b, for example. In this example, the storage subarray ID attribute field 602 of the data structure 600a has been updated (block 338, FIG. 3b) to define the name or identification attribute of the storage subarray represented by the data structure 600a as, in this example, SubArray 72a (FIG. 2b). Similarly, the storage subarray ID attribute field 602 of the data structure 600b has been updated (block 338, FIG. 3b) to define the name or identification attribute of the storage subarray represented by the data structure 600b as, in this example, SubArray 72b (FIG. 2b).

In this embodiment, the storage subarrays, SubArray 72a and SubArray 72b form a pair of subarrays which implement the virtual storage array DiskArray 72 in this example, being added. Accordingly, the paired subarray ID attribute field 608 of the data structure 600a for the storage subpool SubArray 72a, identifies the storage SubArray 72b as the other storage subarray to which the storage SubArray 72a is paired. Conversely, the paired subarray ID attribute field 608 of the data structure 600b for the storage SubArray 72b, identifies the storage SubArray 72a as the other storage subarray to which the storage SubArray 72b is paired.

It is appreciated that automatic identification of a pair of storage subarrays as represented by the storage subarray data structures 600a, 600b, and the automatic assignment of a subarray identification to each storage subarray of the pair, can not only promote load balancing but also increase the ease of use of the storage management interface. Thus, in one aspect of the present description, the user need not be concerned with subarray pairing or identification assignment in connection with the addition of storage arrays to the system.

In connection with the creation and updating of the pair of storage subarray data structures 600a, 600b, the pair of storage subarrays, SubArray 72a and SubArray 72b, represented by the storage subarray data structures 600a, 600b in this example, may be automatically assigned to different storage subpools having different processor nodes to promote load balancing. In this example, the assigned subpool ID attribute field 614 of the data structure 600a has been automatically updated (block 338, FIG. 3b) to define the assigned subpool ID attribute of the storage subarray SubArray 72a represented by the data structure 600a as, in this example, the storage subpool SubPool1a (FIG. 2a). As noted above, the storage subpool SubPool1a is assigned to the processor node ProcessorNode1 as indicated by the assigned processor node ID field 512 (FIG. 5b) for the data structure 500a of the storage subpool SubPool1. Accordingly, the assigned processor node ID attribute field 612 of the storage subarray SubArray 72a represented by the data structure 600a is also assigned to, in this example, the processor node ProcessorNode1 (FIG. 1), the same as that of storage subpool SubPool1a to which the storage subarray SubArray 72a is assigned.

Similarly, the assigned subpool ID attribute field 614 of the data structure 600b has been automatically updated (block 338, FIG. 3b) to define the assigned subpool ID attribute of the storage subarray SubArray 72b represented by the data structure 600b as, in this example, the storage subpool SubPool1b (FIG. 2a). As noted above, the storage subpool SubPool1b is assigned to the processor node ProcessorNode2 as indicated by the assigned processor node ID field 512 (FIG. 5b) for the data structure 500b of the storage subpool SubPool1b. Accordingly, the assigned processor node ID attribute field 612 of the storage subarray SubArray 72b represented by the data structure 600b is also assigned to, in this example, the processor node ProcessorNode2 (FIG. 1), the same as that of storage subpool SubPool1b to which the storage subarray SubArray 72b is assigned. By assigning each storage subarray of the pair of storage subarrays to different subpools of the pair of subpools implementing the virtual storage pool, load balancing may be facilitated. Thus, in one aspect of the present description, the user need not be concerned with processor node assignment in connection with the addition of storage arrays to the system. It is appreciated that in other embodiments, an array or subarray of storage may be assigned individually to a particular storage subpool without a corresponding assignment of a second array or subarray to the other subpool of a pair of subpools implementing a virtual storage pool, depending upon the particular application.

In connection with the creation and updating of the pair of storage subarray data structures 600a, 600b, the pair of storage subarrays, SubArray 72a and SubArray 72b, represented by the storage subarray data structures 600a, 600b in this example, may have a storage type automatically assigned to the pair of subarrays implementing the virtual storage array being added. Alternatively, a desired storage type may be input by the user using a text field 434 (FIG. 4b) of the add a storage array interface page 428. It is appreciated that a storage type for the storage array being added may be input or assigned using a variety of techniques, depending upon the particular application.

In this example, the storage type attribute field 616 of the data structure 600a has been automatically updated (block 338, FIG. 3b) to define the storage type attribute of the storage subarray SubArray 72a represented by the data structure 600a as, in this example, as a disk array type which may be a default storage type, for example. Similarly, the storage type attribute field 616 of the data structure 600b has been automatically updated (block 338, FIG. 3b) to define the storage type as a disk array in accordance with the storage type inputted by the user. It is appreciated that automatic assignment of a storage type for the pair of storage subarrays as represented by the storage subarray data structures 600a, 600b, can increase the ease of use of the storage management interface. Thus, in one aspect of the present description, the user need not be concerned with the virtual storage array being implemented by a pair of storage subarrays.

In connection with the creation and updating of the pair of storage subarray data structures 600a, 600b, the pair of storage subarrays, SubArray 72a and SubArray 72b, represented by the storage subarray data structures 600a, 600b in this example, may have a storage capacity attribute automatically assigned to the pair of subarrays implementing the virtual storage array being added. Alternatively, a storage capacity for the virtual storage array being added may be input by the user using a text field 436 (FIG. 4b) of the add a storage array interface page 428. It is appreciated that a storage capacity for the storage array being added may be input or assigned using a variety of techniques, depending upon the particular application.

In this example, the subarray storage capacity attribute field 618 of the data structure 600a has been automatically updated (block 338, FIG. 3b) to define the storage capacity attribute of the storage subarray SubArray 72a represented by the data structure 600a as, in this example, an a storage capacity equal to one half that of the storage capacity "CAPACITY1" input by the user for the virtual storage array being added. Similarly, the subarray storage capacity attribute field 618 of the data structure 600b has been automatically updated (block 338, FIG. 3b) to define the storage capacity attribute of the storage subarray SubArray 72b represented by the data structure 600b as, in this example, a storage capacity equal to one half that of the storage capacity "CAPACITY1" input by the user for the virtual storage array being added. In this example, the storage capacities of the subarrays 72a, 72b implementing the virtual storage array being added have been split evenly between the pair of subarrays. It is appreciated that an allocation of storage space between the subarrays of the pair may be split in other ratios, depending upon the particular application. It is further appreciated that automatic assignment of a storage capacity to each storage subarray of the pair of storage subarrays as represented by the storage subarray data structures 600a, 600b, can increase the ease of use of the storage management interface. Thus, in one aspect of the present description, the user need not be concerned with the virtual storage array being implemented by a pair of storage subarrays.

As shown in FIG. 5b, the data structures 500a, 500b representing the storage subpools, SubPool1a, SubPool1b, implementing the virtual storage pool StoragePool1 to which the virtual storage array DiskArray 72 is being added, each include an attribute field 506 which when defined, indicates the list of storage subarrays assigned to the subpool. Thus, in this example, the field 506 of the data structure 500a is updated (block 336, FIG. 3b) to indicate within a list of assigned subarrays "ASL1a" that the subarray SubArray 72a has been assigned to the storage subpool SubPool1a. In addition, a field of the storage attribute fields 518 of the subpool data structure 500a is updated (block 336) to include the storage capacity (½ Capacity1, in this example) of the subarray SubArray 72a assigned to the storage subpool Subool1a.

Similarly, the field 506 of the data structure 500b is updated (block 336, FIG. 3b) to indicate within a list of assigned subarrays "ASL1b" that the subarray SubArray 72b has been assigned to the storage subpool SubPool1b. In addition, a field of the storage attribute fields 518 of the subpool data structure 500b is updated (block 336) to include the storage capacity (½ Capacity1, in this example) of the subarray SubArray 72b assigned to the storage subpool Subool1b.

Accordingly, it is seen from the above that a virtual array of storage may be added to a virtual storage pool in pairs of two subarrays, one for each of the pair of processor nodes of the storage controller. In one embodiment, the storage capacities of the pair of subarrays may be balanced. Conversely, an array of storage may be removed from a virtual storage pool in pairs of two subarrays of the same storage type, one for each processor node of the pair of processor nodes of the storage controller. In one embodiment, the storage capacities of the pair of subarrays being removed may be balanced.

FIG. 3c is directed to operations of the storage pool management module 26c (FIG. 2a), for adding a storage volume group such as one of the storage volume groups 77, 84 (FIG. 1) to a storage pool, such as one of the storage pools, StoragePool1 or StoragePool2, for example, of the storage system. As explained in greater detail below, the added storage volume group will be a virtual storage volume group configured with system configuration data stored in a pair of storage volume subgroup system configuration data structures maintained by the system component management 26.

In one operation, an instruction is received (block 352, FIG. 3b) to add a storage volume group to the storage system. In one embodiment, the instruction may be received from a user through an interface such as a graphical user interface (GUI) of the system component management 26 (FIG. 1). It is appreciated that an add storage volume group instruction may be provided by other sources, such as auto-generation, for example.

Figure 4C:
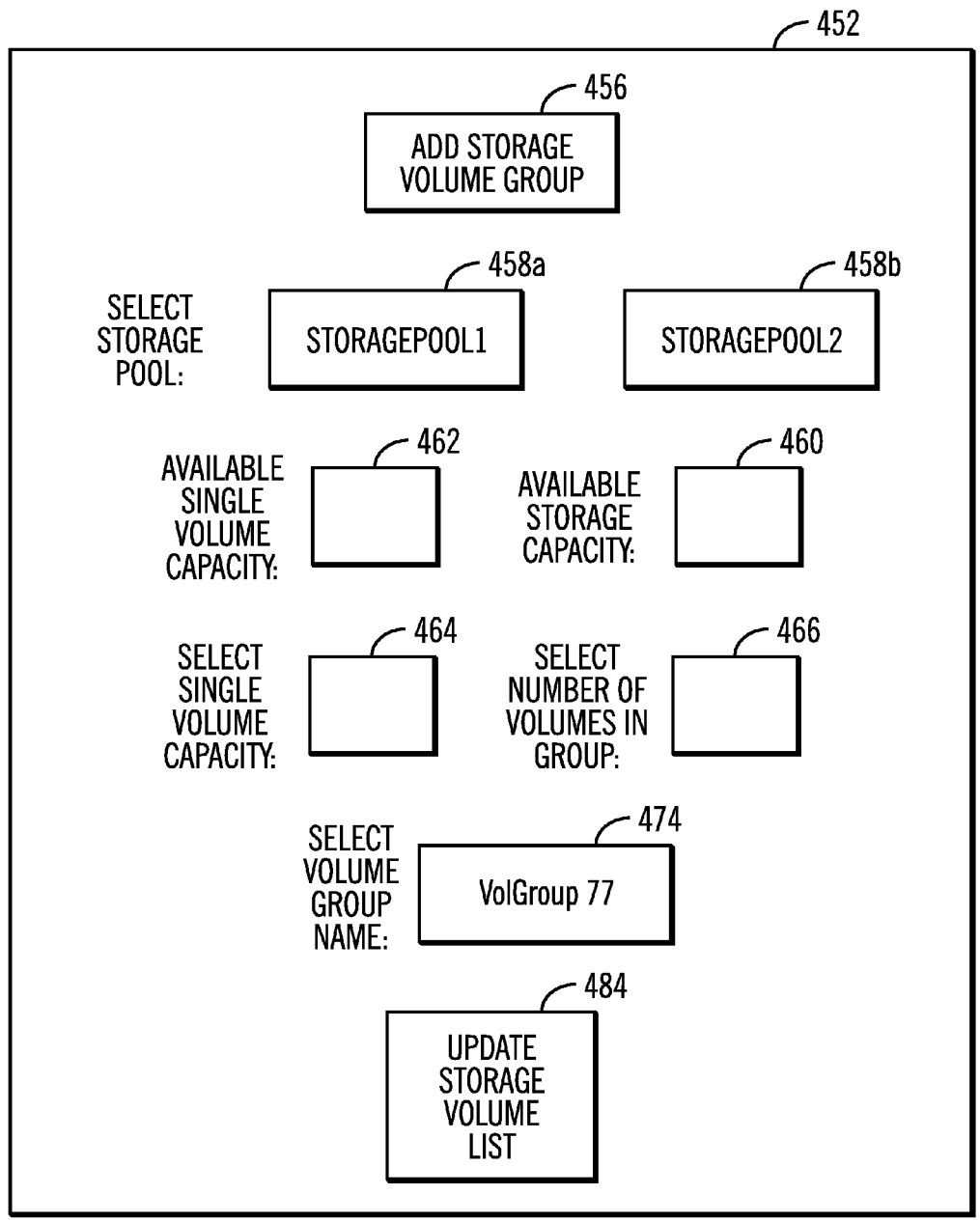

FIG. 4c shows an example of a GUI page or window 452 of an interface of the volume group management module 26c (FIG. 1). The interface page 452 is displayed by a display 408 (FIG. 4a) of the computing system of FIG. 1, for example. In this example, a user may provide an instruction to the system component management of the storage system management to add a storage volume group by clicking on a user input button 456 labeled with the informational text "ADD STORAGE VOLUME GROUP." It is appreciated that other types of GUI elements may be utilized, depending upon the particular application.

In response to receipt (block 352, FIG. 3c) of the instruction to add a storage volume group, the interface enables the user to input (block 356) various parameters or attributes of the storage volume group to be added. In one embodiment, the user may select a particular virtual storage pool, such as StoragePool1 or StoragePool2 (FIG. 1), for example, from which the storage volume group is to be allocated. For example, a virtual storage pool may be selected by clicking on an appropriate pool selection input button 458a, 458b. In other embodiments, the storage pool from which the storage volume group is to be allocated may be selected automatically by the storage management system.

In one embodiment, the interface page 452 indicates the available storage capacity of the selected storage pool in a display element 460. The available storage capacity is the storage capacity which is available for storage volume allocation. In one embodiment, the storage capacity available for storage volume allocation is the total storage capacity available in both storage subpools of the pair of storage subpools implementing the virtual storage pool selected for storage volume allocation. Accordingly, in one embodiment, the total available storage capacity is the sum of the available storage capacities indicated by fields of the storage attributes fields 518 of the subpool data structure 500a and the subpool data structure 500b.

Another display element 462 indicates the available single volume capacity of the selected pool. In one embodiment, the available single volume capacity may be within a range defined by a minimum and a maximum. For example, in one embodiment, the minimum single volume capacity may be the minimum amount of storage contained in a single storage subpool which implements the selected virtual storage pool. In one embodiment, the maximum amount of storage which can be selected for allocation to a single volume may be the amount of available storage contained in a single storage subpool which implements the selected virtual storage pool. Accordingly, in one embodiment, the range of single volume capacity may be indicated by fields of the storage attributes fields 518 (FIG. 5b) of the subpool data structure 500a and the subpool data structure 500b. It is appreciated that in other embodiments, the minimum and maximum size of a single volume of a volume group may vary, depending upon the particular application.

Based upon the displayed storage data for the selected virtual storage pool, the user may input selections of particular values for attributes of the storage volume group to be added and the selected values are received (block 356, FIG. 3c) by the storage management system. In this example, the storage volume group attributes including the name of the storage volume group to be added may be inputted for example, using the GUI 452 of FIG. 4c, for example. Accordingly, based upon the displayed available single volume capacity range, the user may select a particular single volume capacity within the range of available single volume capacities, using an input of the add a storage volume group interface such as the input field 464 of the interface page 452. Similarly, based upon the displayed available storage capacity, and the selected single volume capacity, the user may select the number of volumes to be provided in the storage volume group being added, using an input of the add a storage volume group interface such as the input field 466 of the interface page 452. The number of storage volumes which may be selected for the group is generally limited by the size of the selected single volume capacity and the total storage capacity available for allocation. In addition, a storage volume group name such as VolGroup 77 (FIG. 1), for example, may be input into a text field 474, for example.

Using the inputted storage volume group attributes, the storage management system can initiate the process of updating the list of storage volume groups added to the storage system. The list of storage volume groups may be updated automatically in response to receipt of the user's storage volume group attributes or may be updated in response to receipt of an update instruction triggered by the user clicking on an "UPDATE STORAGE VOLUME GROUP LIST" input button 484 (FIG. 4c), for example.

In the illustrated embodiment, the storage volume group being added, storage volume group VolGroup 77 (FIG. 1) in this example, is a virtual storage volume group implemented with a pair of (that is, two) storage volume subgroups, volume subgroup VolSubGroup 77a, and volume subgroup VolSubGroup 77b (FIG. 2b) in this example, one for each of the processor nodes, ProcessorNode1, ProcessorNode2 (FIG. 1) of the storage controller 58. Each storage volume subgroup of the pair of storage volume subgroups, is represented by a storage volume subgroup data structure, an example of which is the storage volume subgroup data structure 700 of FIG. 7a. The system component management 26 of the storage management system 32 maintains the system configuration data structures such as the storage volume subgroup data structure 700 of FIG. 7a. Each system configuration data structure 700 is configured to store system configuration data for a storage volume subgroup in the form of attribute data.

As shown in FIG. 7a, the storage volume subgroup data structure 700, in one embodiment, includes attribute fields including an attribute field 702 to store a storage volume subgroup ID (identification) attribute such as a serial number or name, for example, and an attribute field 704 to store the name of the virtual storage volume group represented by the pair of storage volume subgroups, one of which is the particular storage volume subgroup represented by the data structure 700. The storage volume subgroup data structure 700, in one embodiment, further has an attribute field 706 to store a list of storage volumes assigned to that storage volume subgroup, and an attribute field 708 to identify the particular storage volume subgroup which has been paired with the particular storage volume subgroup represented by the storage volume subgroup data structure 700, to implement a virtual storage volume group. The data structure 700 further has an attribute field 712 to identify the particular processor node to which the particular storage volume subgroup of the data structure 700 has been assigned, and an attribute field 714 to identify the storage subpool to which the particular storage volume subgroup of the data structure 700 has been assigned. It is appreciated that in other embodiments, a storage volume subgroup system configuration data structure may have additional attributes and attribute fields, fewer attributes and attribute fields or different attributes and attribute fields, depending upon the particular application.

In this embodiment, in connection with the receipt (block 356, FIG. 3c) of the attributes of the storage volume group to be added, and an instruction to update the storage volume group list of the storage systems to be represented and managed in the storage management system, a pair of storage volume subgroups meeting the specified storage volume group attributes will be created. In one embodiment, the pair of storage volume subgroups will together having a combined number of storage volumes meeting the specified number of storage volumes for the storage volume group to be added, each storage volume having the specified single volume capacity.

To create the pair of storage volume subgroups, a corresponding pair of volume subgroup system configuration data structures are created (block 360), each of which is similar to the storage volume subgroup system configuration data structure 700 of FIG. 7*a*. The pair of data structures and the pair of storage volume subgroups represented by the pair of storage volume subgroup data structures, may be created automatically in response to receipt of the storage volume group attributes or may be created in response to receipt of an update instruction triggered by the user clicking on an "UPDATE STORAGE VOLUME GROUP LIST" input button 484, for example.

In addition, each volume subgroup of the pair of storage volume subgroups represented by the pair of data structures may be automatically assigned (block 364) to different subpools (and their associated processor nodes) to promote load balancing as described below. The subpool data structures representing the storage pools may be updated (block 366) to indicate the assignment of the additional storage volume subgroups to the storage subpools implementing the virtual storage pool to which the virtual storage volume group is being added. Further, the pair of data structures representing the pair of storage volume subgroups, may be updated (block 368) automatically in response to receipt of the attribute data or in in response to receipt of an update instruction triggered by the user clicking on an "UPDATE STORAGE VOLUME GROUP LIST" input button 484, for example.

FIG. 7*b* shows one example of a pair of storage volume subgroup data structures 700*a*, 700*b* after they have been created (block 360, FIG. 3*c*) and updated (block 368, FIG. 3*c*) following the input of the attributes provided by the add storage volume group interface of FIG. 4*c*. For example, the storage volume group name attribute field 704 of the data structure 700*a* has been updated (block 360, FIG. 3*c*) to define the name attribute of the storage volume group being added as, in this example, VolGroup 77, which is represented by the pair of storage volume subgroup data structures 700*a*, 700*b* of FIG. 7*b*. Similarly, the storage volume group name attribute field 704 of the data structure 700*b* has been updated (block 360, FIG. 3*c*) to define the same name attribute of the storage volume group being added, in this example, VolGroup 77, which is represented by the pair of storage volume subgroup data structures 700*a*, 700*b* of FIG. 7*b*.

In connection with the creation and updating of the storage volume subgroup data structures 700*a*, 700*b*, an appropriate volume subgroup identification may be automatically generated by the storage management system to identify the pair of storage volume subgroups represented by the pair of storage volume subgroup data structures 700*a*, 700*b*, for example. In this example, the storage volume subgroup ID attribute field 702 of the data structure 700*a* has been updated (block 368, FIG. 3*c*) to define the name or identification attribute of the storage volume subgroup represented by the data structure 700*a* as, in this example, VolSubGroup 77*a* (FIG. 2*b*). Similarly, the storage volume subgroup ID attribute field 702 of the data structure 700*b* has been updated (block 368, FIG. 3*c*) to define the name or identification attribute of the storage volume subgroup represented by the data structure 700*b* as, in this example, VolSubGroup 77*b* (FIG. 2*b*).

In this embodiment, the storage volume subgroups, VolSubGroup 77*a* and VolSubGroup 77*b* form a pair of volume subgroups which implement the virtual storage volume group VolGroup 77 in this example, being added. Accordingly, the paired volume subgroup ID attribute field 708 of the data structure 700*a* for the storage subpool VolSubGroup 77*a*, identifies the storage volume subgroup VolSubGroup 77*b* as the other storage volume subgroup to which the storage volume subgroup VolSubGroup 77*a* is paired. Conversely, the paired volume subgroup ID attribute field 708 of the data structure 700*b* for the storage volume subgroup VolSubGroup 77*b*, identifies the storage volume subgroup VolSubGroup 77*a* as the other storage volume subgroup to which the storage volume subgroup VolSubGroup 77*b* is paired.

It is appreciated that automatic creation of a pair of storage volume subgroups as represented by the storage volume subgroup data structures 700*a*, 700*b*, and the automatic assignment of a volume subgroup identification to each storage volume subgroup of the pair, can not only promote load balancing but also increase the ease of use of the storage management interface. Thus, in one aspect of the present description, the user need not be concerned with volume subgroup pairing or identification assignment in connection with the addition of storage volume groups to the system.

In connection with the creation and updating of the pair of storage volume subgroup data structures 700*a*, 700*b*, the pair of storage volume subgroups, VolSubGroup 77*a* and VolSubGroup 77*b*, represented by the storage volume subgroup data structures 700*a*, 700*b*, respectively, in this example, may be automatically assigned to different storage subpools having different processor nodes to promote load balancing.

In this example, the assigned subpool ID attribute field 714 of the data structure 700*a* has been automatically updated (block 368, FIG. 3*c*) to define the assigned subpool ID attribute of the storage volume subgroup VolSubGroup 77*a* represented by the data structure 700*a* as, in this example, the storage subpool SubPool1*a* (FIG. 2*b*). As noted above, the storage subpool SubPool1*a* is assigned to the processor node ProcessorNode1 as indicated by the assigned processor node ID field 512 (FIG. 5*b*) for the data structure 500*a* of the storage subpool SubPool1. Accordingly, the assigned processor node ID attribute field 712 of the storage volume subgroup VolSubGroup 77*a* represented by the data structure 700*a* is also assigned to, in this example, the processor node ProcessorNode1 (FIG. 1), the same as that of storage subpool SubPool1*a* to which the storage volume subgroup VolSubGroup 77*a* is assigned.

Similarly, the assigned subpool ID attribute field 714 of the data structure 700*b* has been automatically updated (block 368, FIG. 3*c*) to define the assigned subpool ID attribute of the storage volume subgroup VolSubGroup 77*b* represented by the data structure 700*b* as, in this example, the storage subpool SubPool1*b* (FIG. 2*a*). As noted above, the storage subpool SubPool1*b* is assigned to the processor node ProcessorNode2 as indicated by the assigned processor node ID field 512 (FIG. 5*b*) for the data structure 500*b* of the storage subpool Subpool1*a*. Accordingly, the assigned processor node ID attribute field 712 of the storage volume subgroup VolSubGroup 77*b* represented by the data structure 700*b* is also assigned to, in this example, the processor node ProcessorNode2 (FIG. 1), the same as that of storage subpool SubPool1*b* to which the storage volume subgroup VolSubGroup 77*b* is assigned. By assigning each storage volume subgroup of the pair of storage volume subgroups to different subpools of the pair of subpools implementing the selected virtual storage pool, load balancing may be facilitated. Thus, in one aspect of the present description, the user need not be concerned with processor node assignment in connection with the addition of storage volume groups to the system. It is appreciated that in other embodiments, a volume subgroup of storage volumes may be assigned individually to a particular storage subpool without a corresponding assignment of a second volume subgroup to the other subpool of a pair of subpools implementing a virtual storage pool, depending upon the particular application.

As shown in FIG. 5b, the data structures 500a, 500b representing the storage subpools, SubPool1, Subpool2, implementing the virtual storage pool StoragePool1 to which the virtual storage volume group VolGroup 77 is being added, each include storage attribute fields 518 which include a field which when defined, indicates a list of storage volume subgroups assigned to the subpool. Thus, in this example, a field of the fields 518 of the data structure 500a is updated (block 366, FIG. 3c) to indicate within a list of assigned volume subgroups that the volume subgroup VolSubGroup 77a has been assigned to the storage subpool SubPool1a. Similarly, a field of the fields 518 of the data structure 500b is updated (block 366, FIG. 3c) to indicate within a list of assigned volume subgroups that the volume subgroup VolSubGroup 77b has been assigned to the storage subpool SubPool1b.

In creating the volume subgroup VolSubGroup 77a from the storage subpool SubPool1a, the allocated storage capacity of the storage subpool SubPool1a is correspondingly increased and the available storage capacity for future allocations is correspondingly decreased. Accordingly, an allocated storage capacity attribute field of the fields 518 of the data structure 500a may be updated (block 366, FIG. 3c) to indicate the change in allocated storage space for the storage subpool SubPool1a. Similarly, an available storage capacity attribute field of the fields 518 of the data structure 500a is updated (block 366, FIG. 3c) to indicate the change in available storage capacity for the storage subpool SubPool1a.

In a similar manner, in creating the volume subgroup VolSubGroup 77b from the storage subpool SubPool1b, the allocated storage capacity of the storage subpool SubPool1b is correspondingly increased and the available storage capacity for future allocations is correspondingly decreased. Accordingly, an allocated storage capacity attribute field of the fields 518 of the data structure 500b may be updated (block 366, FIG. 3c) to indicate the change in allocated storage space for the storage subpool SubPool1b. Similarly, an available storage capacity attribute field of the fields 518 of the data structure 500b is updated (block 368, FIG. 3c) to indicate the change in available storage capacity for the storage subpool SubPool1b. The attribute fields 518 of each data structure 500a, 500b of the selected virtual storage pool can provide the storage data displayed in the fields 462, 460 (FIG. 4c) for the selected virtual storage pool.

In one example, the number of storage volumes in each storage volume subgroup of the pair of storage volume subgroups may be split evenly such that the number of storage volumes in the storage volume subgroup VolSubGroup 77a is the same as that in the storage volume subgroup VolSubGroup 77b wherein the total number of storage volumes in both subgroups VolSubGroup 77a, VolSubGroup 77b is the total requested by the user (input field 466) through the interface of FIG. 4c. However, it is appreciated that in some embodiments, the storage management system may create a larger number of storage volumes in one storage volume subgroup as compared to those created in the other storage volume subgroup of the pair of storage volume subgroups to facilitate load balancing, depending upon the particular application.

For example, in deleting storage volumes, a user may delete more storage volumes which have been allocated from one storage subpool and fewer from another storage subpool of a pair of storage subpools. If so, the storage management system may compensate by allocating more storage volumes from one subpool of the pair than the other subpool of the pair, when adding a new storage volume group to the storage pool implemented by the pair of storage subpools.

In another example, as storage volumes are migrated from a source storage subpool (such as SubPool1a (FIG. 2b) for example) of one storage pool (such as StoragePool1, for example), to a target storage subpool (such as a subpool SubPool2a (FIG. 2c)) of another storage pool (such as StoragePool2), for example, the storage management system may compensate by allocating more storage volumes from one subpool (the source subpool, SubPool1a) of the pair than the other subpool (the non-source subpool, SubPool1b) of the pair, when adding a new storage volume group to the storage pool StoragePool1 implemented by the pair (source and non-source) of storage subpools, SubPool1a, SubPool1b.

In one embodiment, when a storage volume is migrated from a source storage subpool (such as SubPool1a, for example) of one storage pool (such as storage pool StoragePool1, for example), to a target storage subpool (such as SubPool2a, for example) of another storage pool (such as StoragePool2, in this example), both the source and target storage subpools, SubPool1a, SubPool2a will be assigned to the same processor node (ProcessorNode1 in this example) for handling input/output operations. If the target storage pool has insufficient available storage capacity to accommodate an appropriate distribution (such as an even distribution, for example) of storage volumes between storage subpools of the target storage pool, the migration command may fail, in some embodiments.

In another aspect of the present description, renaming of a virtual storage pool is readily facilitated. For example, the storage pool name field 504 of the pair of subpool data structures 500a, 500b (FIG. 5b) representing the storage pool being renamed may be updated to indicate the new name.

In yet another aspect of the present description, merging of two or more virtual storage pools is readily facilitated. For example, two virtual storage pools, such as StoragePool1 and StoragePool2 (FIG. 1), for example, each represented by a pair of storage subpool data structures as discussed above, may be merged to a merged virtual storage pool represented by a pair of subpool data structures in which the fields of the pair of subpool data structures representing the merged storage pool have been updated with attribute data collected from the pairs of subpool data structures of the storage pools being merged. For example, the storage pool name fields 504 of the pair of subpool data structures 500a, 500b representing the merged storage pool may be updated to indicate the name of the merged pool. In addition, the lists of assigned subarrays of the attribute fields 506 of the subpool data structures 500a of each of the pools StoragePool1, StoragePool2, being merged, can be combined in an attribute field 506 of the data structure 500a of the pair of data structures representing the merged storage pool. Similarly, the lists of assigned subarrays of the attribute fields 506 of the subpool data structures 500b of each of the pools StoragePool1, StoragePool2, being merged, can be combined in an attribute field 506 of the data structure 500b of the pair of data structures representing the merged storage pool.

Still further, the storage attributes in the fields 518 including the total storage capacity, available storage capacity, allocated storage capacity, and single storage volume capacity range of each of the subpool data structures 500a of the pools StoragePool1, StoragePool2, being merged, may be combined in corresponding attribute fields 518 of the data structure 500a of the pair of data structures representing the merged storage pool. Similarly, the storage attributes in the fields 518 including the total storage capacity, available storage capacity, allocated storage capacity, and single storage volume capacity range of each of the subpool data structures 500b of the pools StoragePool1, StoragePool2, being merged, may be combined in corresponding attribute fields 518 of the data structure 500b of the pair of data structures representing the merged storage pool.

In another aspect, a virtual storage pool may be deleted by deleting the pair of data structures 500a, 500b representing the virtual data structure. Similarly, a virtual storage array may be deleted by deleting the pair of data structures 600a, 600b representing the virtual storage array.

It is seen from the above, in one aspect of the present description, that a degree of load balancing may automatically be achieved by the storage system creating a pair of storage subpools in response to a request to add a storage pool and automatically assigning the pair of storage subpools to different processor nodes. Accordingly, the input/output operations to and from each storage subpool of the pair are processed primarily by the associated processor node to which the storage subpool is assigned.

In addition, the pair of subpools may be effectively managed by the user as a single virtual storage pool which is actually implemented in the storage management system as a pair of storage subpools of the virtual storage pool. Thus, in one embodiment for example, the user need not be concerned with assigning the virtual storage pool to any one processor node because the pair of subpools implementing the virtual storage pool are automatically assigned to different processor nodes, to facilitate load balancing. Other aspects and features may be achieved in a storage management system employing multiple storage subpools of a virtual storage pool in accordance with the present description, depending upon the particular application.

Although one embodiment of the present description is described in connection with a storage controller having two processor nodes, it is appreciated that aspects of the present description are also applicable to multiple processor node storage controllers having more than two such processor nodes. For example, a storage controller having multiple processor nodes may be accommodated by adding a set of storage subpools to fulfill a request for a storage pool in which each storage subpool of the set is assigned to a different processor node.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
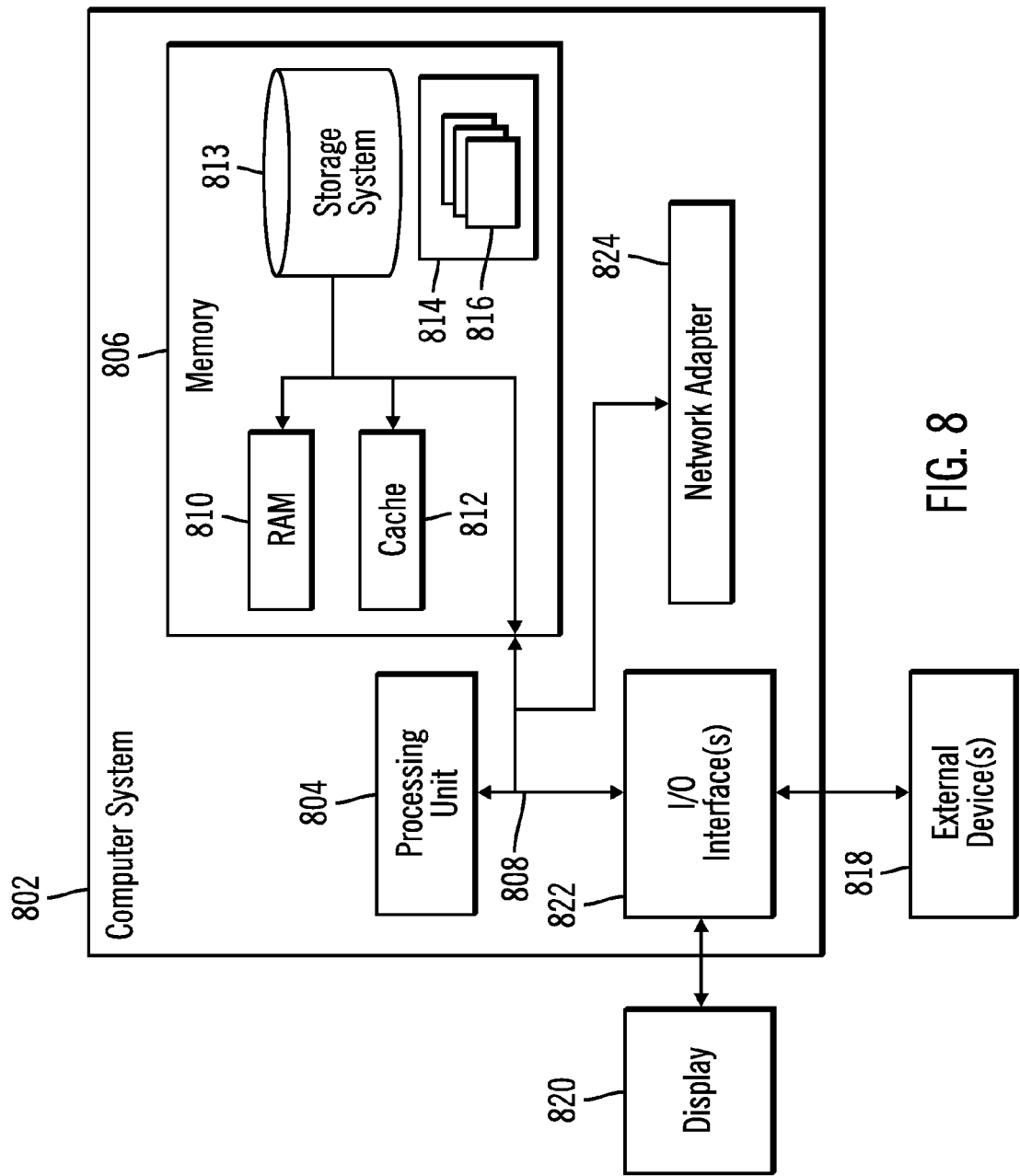
FIG. 8 illustrates a computing environment in which components of FIG. 1 may be implemented.

The computational components of FIG. 1, including the hosts and storage server 42 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The reference characters used herein, such as i and n, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing a storage management system to manage a server in a computing system having a storage controller and a storage unit controlled by the storage controller and containing storage volumes, wherein the server has a plurality of processor nodes, and the computer program product comprises a computer readable storage medium having program instructions embodied therewith, the program instructions executable by a processor node of the server to cause operations, the operations comprising:

in response to a user request for a pool of storage, creating a first virtual storage pool comprising a first set of storage subpools, at least one subpool of the first set of storage subpools for each processor node of the plurality of processor nodes wherein the storage capacity of the first virtual storage pool is the combined storage capacities of the first set of storage subpools; and load balancing for the plurality of processor nodes, the load balancing including, for each processor node of the plurality of processor nodes, automatically assigning each subpool of the first set of subpools, to an associated processor node so that input/output operations to and from each storage subpool are processed primarily by the associated processor node to which the storage subpool is assigned and so that each processor node of the plurality of processor nodes is assigned at least one storage subpool of the first set of storage subpools of the first virtual storage pool.

2. The computer program product of claim 1, wherein the operations further comprise:

representing the first virtual storage pool in a user interface, wherein the representing includes maintaining a first set of storage subpool data structures wherein the first set of storage subpool data structures includes a storage subpool data structure for each storage subpool of the first set of storage subpools of the first virtual storage pool, and wherein each storage subpool data structure of the first set of storage subpool data structures for the first virtual storage pool, stores storage subpool attribute data defining attributes of an associated storage subpool of the first set of storage subpools of the first virtual storage pool, wherein the storage subpool attribute data stored in each storage subpool data structure of the first set of storage subpool data structures for the first virtual storage pool includes a name attribute which defines a first name of the first virtual storage pool of the first set of storage subpools.

3. The computer program product of claim 2, wherein the operations further comprise:

renaming the first virtual storage pool from the first name to a second name, wherein the renaming includes redefining the name attribute of each storage subpool data structure of the first set of storage subpool data structures for the first virtual storage pool so that the name attribute of each storage subpool data structure of the first set of storage subpool data structures for the first virtual storage pool defines the second name of the first virtual storage pool.

4. The computer program product of claim 1, wherein the operations further comprise:

in response to a user request for another pool of storage, creating a second virtual storage pool comprising a second set of storage subpools wherein the storage capacity of the second virtual storage pool is the combined storage capacities of the second set of storage subpools;

for each processor node of the plurality of processor nodes, assigning each subpool of the second set of subpools, to an associated processor node so that input/output operations to and from each storage subpool of the second set of subpools, are processed primarily by the associated processor node to which the storage subpool of the second set of subpools is assigned and so that each processor node of the plurality of processor nodes is assigned at least one storage subpool of the second set of storage subpools of the second virtual storage pool; and in response to a user request to merge the first and second virtual storage pools, merging storage subpools of the first and second virtual storage pools so that each storage subpool of the first set of storage subpools is merged with a corresponding storage subpool of the second set of storage subpools, in which corresponding storage subpools are assigned to the same associated processor node.

5. The computer program product of claim 1, wherein the operations further comprise:

in response to a user request for a first group of volumes from the first virtual storage pool, creating a first plurality of subgroups of storage volumes, each subgroup of storage volumes being created from a storage subpool of the first set of storage subpools of the first virtual storage pool wherein the first group of storage volumes are provided by the combination of the first plurality of subgroups of storage volumes of the first virtual storage pool.

6. The computer program product of claim 5, wherein the operations further comprise:

in response to a user request for another pool of storage, creating a second virtual storage pool comprising a second set of storage subpools wherein the storage capacity of the second virtual storage pool is the combined storage capacities of the second set of storage subpools;

for each processor node of the plurality of processor nodes, assigning each subpool of the second set of subpools, to an associated processor node so that input/output operations to and from each storage subpool of the second set of subpools, are processed primarily by the associated processor node to which the storage subpool of the second set of subpools is assigned and so that each processor node of the plurality of processor nodes is assigned at least one storage subpool of the second set of storage subpools of the second virtual storage pool; and migrating a storage volume from a storage subpool of the first virtual storage pool to a corresponding storage subpool of the second set of storage subpools, in which corresponding storage subpools are assigned to the same associated processor node.

7. The computer program product of claim 1, wherein the operations further comprise:

in response to a user request to add storage capacity to the first virtual storage pool, identifying a first set of storage subarrays;

creating a first virtual storage array comprising the identified first set of storage subarrays wherein the storage capacity of the first virtual storage array is the combined storage capacities of the first set of storage subarrays; and assigning each storage subarray of the first set of storage subarrays to a corresponding storage subpool of the first set of storage subpools, so that input/output operations to and from each storage subarray of the first set of storage subarrays, are processed primarily by the associated processor node to which the corresponding storage subpool of the first set of subpools is assigned and so that each processor node of the plurality of processor nodes is assigned at least one storage subarray of the first set of storage subarrays of the first virtual storage pool.

8. The computer program product of claim 7, wherein the operations further comprise:

representing the first virtual storage array in a user interface, wherein the virtual storage array representing includes maintaining a first set of storage subarray data structures wherein the first set of storage subarray data structures includes a storage subarray data structure for each storage sub array of the first set of storage subarrays of the first virtual storage array, and wherein each storage subarray data structure of the first set of storage subarray data structures for the first virtual storage array, stores storage subarray attribute data defining attributes of an associated storage subarray of the first set of storage subarrays of the first virtual storage array, wherein the storage subarray attribute data stored in each storage sub array data structure of the first set of storage subarray data structures for the first virtual storage array includes a name attribute which defines a first name of the first virtual storage array of the first set of storage subarrays.

9. A computing system for use with a host and a plurality of storage units configurable to provide a storage pools and configurable to contain storage volumes, comprising;

a server having a storage controller having a memory and a plurality of processor nodes configured to control input/output operations between a host and a storage unit, and a storage management system which includes a computer program product to manage the server, wherein the computer program product comprises a computer readable storage medium having program instructions embodied therewith, the program instructions executable by a processor node of the server to cause operations, the operations comprising:

in response to a user request for a storage pool, creating a first virtual storage pool comprising a first set of storage subpools, at least one subpool of the first set of storage subpools for each processor node of the plurality of processor nodes wherein the storage capacity of the first virtual storage pool is the combined storage capacities of the first set of storage subpools; and load balancing for the plurality of processor nodes, the load balancing including, for each processor node of the plurality of processor nodes, automatically assigning each subpool of the first set of subpools, to an associated processor node so that input/output operations to and from each storage subpool are processed primarily by the associated processor node to which the storage subpool is assigned and so that each processor node of the plurality of processor nodes is assigned at least one storage subpool of the first set of storage subpools of the first virtual storage pool.

10. The system of claim 9, wherein the operations further comprise:

representing the first virtual storage pool in a user interface, wherein the representing includes maintaining in the memory a first set of storage subpool data structures wherein the first set of storage subpool data structures includes a storage subpool data structure for each storage subpool of the first set of storage subpools of the first virtual storage pool, and wherein each storage subpool data structure of the first set of storage subpool data structures for the first virtual storage pool, stores storage subpool attribute data defining attributes of an associated storage subpool of the first set of storage subpools of the first virtual storage pool, wherein the storage subpool attribute data stored in each storage subpool data structure of the first set of storage subpool data structures for the first virtual storage pool includes a name attribute which defines a first name of the first virtual storage pool of the first set of storage subpools.

11. The system of claim 10, wherein the operations further comprise:
renaming the first virtual storage pool from the first name to a second name, wherein the renaming includes redefining the name attribute of each storage subpool data structure of the first set of storage subpool data structures for the first virtual storage pool so that the name attribute of each storage subpool data structure of the first set of storage subpool data structures for the first virtual storage pool defines the second name of the first virtual storage pool.

12. The system of claim 9, wherein the operations further comprise:
in response to a user request for another storage pool, creating a second virtual storage pool comprising a second set of storage subpools wherein the storage capacity of the second virtual storage pool is the combined storage capacities of the second set of storage subpools;
for each processor node of the plurality of processor nodes, assigning each subpool of the second set of subpools, to an associated processor node so that input/output operations to and from each storage subpool of the second set of subpools, are processed primarily by the associated processor node to which the storage subpool of the second set of subpools is assigned and so that each processor node of the plurality of processor nodes is assigned at least one storage subpool of the second set of storage subpools of the second virtual storage pool; and
in response to a user request to merge the first and second virtual storage pools, merging storage subpools of the first and second virtual storage pools so that each storage subpool of the first set of storage subpools is merged with a corresponding storage subpool of the second set of storage subpools, in which corresponding storage subpools are assigned to the same associated processor node.

13. The system of claim 9, wherein the operations further comprise:
in response to a user request for a first group of volumes from the first virtual storage pool, creating a first plurality of subgroups of storage volumes, each subgroup of storage volumes being created from a storage subpool of the first set of storage subpools of the first virtual storage pool wherein the first group of storage volumes are provided by the combination of the first plurality of subgroups of storage volumes of the first virtual storage pool.

14. The system of claim 13, wherein the operations further comprise:
in response to a user request for another storage pool, creating a second virtual storage pool comprising a second set of storage subpools wherein the storage capacity of the second virtual storage pool is the combined storage capacities of the second set of storage subpools;
for each processor node of the plurality of processor nodes, assigning each subpool of the second set of subpools, to an associated processor node so that input/output operations to and from each storage subpool of the second set of subpools, are processed primarily by the associated processor node to which the storage subpool of the second set of subpools is assigned and so that each processor node of the plurality of processor nodes is assigned at least one storage subpool of the second set of storage subpools of the second virtual storage pool; and
migrating a storage volume from a storage subpool of the first virtual storage pool to a corresponding storage subpool of the second set of storage subpools, in which corresponding storage subpools are assigned to the same associated processor node.

15. The system of claim 9, wherein the storage units include storage arrays, the operations further comprise:
in response to a user request to add storage capacity to the first virtual storage pool, identifying a first set of storage subarrays;
creating a first virtual storage array comprising the identified first set of storage subarrays wherein the storage capacity of the first virtual storage array is the combined storage capacities of the first set of storage subarrays; and
assigning each storage subarray of the first set of storage subarrays to a corresponding storage subpool of the first set of storage subpools, so that input/output operations to and from each storage subarray of the first set of storage subarrays, are processed primarily by the associated processor node to which the corresponding storage subpool of the first set of subpools is assigned and so that each processor node of the plurality of processor nodes is assigned at least one storage subarray of the first set of storage subarrays of the first virtual storage pool.

16. The system of claim 15, wherein the operations further comprise:
representing the first virtual storage array in a user interface, wherein the virtual storage array representing includes maintaining a first set of storage subarray data structures wherein the first set of storage subarray data structures includes a storage subarray data structure for each storage subarray of the first set of storage subarrays of the first virtual storage array, and wherein each storage subarray data structure of the first set of storage subarray data structures for the first virtual storage array, stores storage subarray attribute data defining attributes of an associated storage subarray of the first set of storage subarrays of the first virtual storage array, wherein the storage subarray attribute data stored in each storage subarray data structure of the first set of storage subarray data structures for the first virtual storage array includes a name attribute which defines a first name of the first virtual storage array of the first set of storage subarrays.

17. A method of storage management for managing a server in a computing system having a storage controller having a plurality of processor nodes, and a storage unit controlled by the storage controller and containing storage volumes, comprising:
in response to a user request for a pool of storage, creating a first virtual storage pool comprising a first set of storage subpools, at least one subpool of the first set of storage subpools for each processor node of the plurality of processor nodes wherein the storage capacity of the first virtual storage pool is the combined storage capacities of the first set of storage subpools; and load balancing for the plurality of processor nodes, the load balancing including, for each processor node of the plurality of processor nodes, automatically assigning each subpool of the first set of subpools, to an associated processor node so that input/output operations to and from each storage subpool are processed primarily by the associated processor node to which the storage subpool is assigned and so that each processor node of the plurality of processor nodes is assigned at least one storage subpool of the first set of storage subpools of the first virtual storage pool.

18. The method of claim 17, further comprising:

representing the first virtual storage pool in a user interface, wherein the representing includes maintaining a first set of storage subpool data structures wherein the first set of storage subpool data structures includes a storage subpool data structure for each storage subpool of the first set of storage subpools of the first virtual storage pool, and wherein each storage subpool data structure of the first set of storage subpool data structures for the first virtual storage pool, stores storage subpool attribute data defining attributes of an associated storage subpool of the first set of storage subpools of the first virtual storage pool, wherein the storage subpool attribute data stored in each storage subpool data structure of the first set of storage subpool data structures for the first virtual storage pool includes a name attribute which defines a first name of the first virtual storage pool of the first set of storage subpools.

19. The method of claim 18, further comprising:

renaming the first virtual storage pool from the first name to a second name, wherein the renaming includes redefining the name attribute of each storage subpool data structure of the first set of storage subpool data structures for the first virtual storage pool so that the name attribute of each storage subpool data structure of the first set of storage subpool data structures for the first virtual storage pool defines the second name of the first virtual storage pool.

20. The method of claim 17, further comprising:

in response to a user request for another pool of storage, creating a second virtual storage pool comprising a second set of storage subpools wherein the storage capacity of the second virtual storage pool is the combined storage capacities of the second set of storage subpools;

for each processor node of the plurality of processor nodes, assigning each subpool of the second set of subpools, to an associated processor node so that input/output operations to and from each storage subpool of the second set of subpools, are processed primarily by the associated processor node to which the storage subpool of the second set of subpools is assigned and so that each processor node of the plurality of processor nodes is assigned at least one storage subpool of the second set of storage subpools of the second virtual storage pool; and in response to a user request to merge the first and second virtual storage pools, merging storage subpools of the first and second virtual storage pools so that each storage subpool of the first set of storage subpools is merged with a corresponding storage subpool of the second set of storage subpools, in which corresponding storage subpools are assigned to the same associated processor node.

21. The method of claim 17, further comprising:

in response to a user request for a first group of volumes from the first virtual storage pool, creating a first plurality of subgroups of storage volumes, each subgroup of storage volumes being created from a storage subpool of the first set of storage subpools of the first virtual storage pool wherein the first group of storage volumes are provided by the combination of the first plurality of subgroups of storage volumes of the first virtual storage pool.

22. The method of claim 21, further comprising:

in response to a user request for another pool of storage, creating a second virtual storage pool comprising a second set of storage subpools wherein the storage capacity of the second virtual storage pool is the combined storage capacities of the second set of storage subpools;

for each processor node of the plurality of processor nodes, assigning each subpool of the second set of subpools, to an associated processor node so that input/output operations to and from each storage subpool of the second set of subpools, are processed primarily by the associated processor node to which the storage subpool of the second set of subpools is assigned and so that each processor node of the plurality of processor nodes is assigned at least one storage subpool of the second set of storage subpools of the second virtual storage pool; and migrating a storage volume from a storage subpool of the first virtual storage pool to a corresponding storage subpool of the second set of storage subpools, in which corresponding storage subpools are assigned to the same associated processor node.

23. The method of claim 17, further comprising:

in response to a user request to add storage capacity to the first virtual storage pool, identifying a first set of storage subarrays;

creating a first virtual storage array comprising the identified first set of storage subarrays wherein the storage capacity of the first virtual storage array is the combined storage capacities of the first set of storage subarrays; and assigning each storage subarray of the first set of storage subarrays to a corresponding storage subpool of the first set of storage subpools, so that input/output operations to and from each storage subarray of the first set of storage subarrays, are processed primarily by the associated processor node to which the corresponding storage subpool of the first set of subpools is assigned and so that each processor node of the plurality of processor nodes is assigned at least one storage subarray of the first set of storage subarrays of the first virtual storage pool.

24. The method of claim 23, further comprising:

representing the first virtual storage array in a user interface, wherein the virtual storage array representing includes maintaining a first set of storage subarray data structures wherein the first set of storage subarray data structures includes a storage subarray data structure for each storage sub array of the first set of storage subarrays of the first virtual storage array, and wherein each storage subarray data structure of the first set of storage subarray data structures for the first virtual storage array, stores storage subarray attribute data defining attributes of an associated storage subarray of the first set of storage subarrays of the first virtual storage array, wherein the storage subarray attribute data stored in each storage subarray data structure of the first set of storage subarray data structures for the first virtual storage array includes a name attribute which defines a first name of the first virtual storage array of the first set of storage subarrays.

* * * * *